United States Patent
Wu et al.

(10) Patent No.: US 10,956,235 B2
(45) Date of Patent: Mar. 23, 2021

(54) EVENT EXECUTION METHOD, DEVICE, AND SYSTEM

(71) Applicant: TENCENT TECHNOLOGY (SHENZHEN) COMPANY LIMITED, Shenzhen (CN)

(72) Inventors: Jianguo Wu, Shenzhen (CN); Shanlin Li, Shenzhen (CN); Nengmu Jiang, Shenzhen (CN); Yuan Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 21 days.

(21) Appl. No.: 15/956,405

(22) Filed: Apr. 18, 2018

(65) Prior Publication Data

US 2018/0239656 A1    Aug. 23, 2018

Related U.S. Application Data

(63) Continuation of application No. PCT/CN2017/071965, filed on Jan. 20, 2017.

(30) Foreign Application Priority Data

Jan. 28, 2016  (CN) .......................... 201610060190.5

(51) Int. Cl.
*G06F 9/54* (2006.01)
*G06Q 20/32* (2012.01)
(Continued)

(52) U.S. Cl.
CPC .............. *G06F 9/542* (2013.01); *G06F 9/448* (2018.02); *G06Q 20/32* (2013.01); *G06Q 20/405* (2013.01); *G06Q 20/047* (2020.05)

(58) Field of Classification Search
None
See application file for complete search history.

(56) References Cited

U.S. PATENT DOCUMENTS

| | | | |
|---|---|---|---|
| 2010/0114733 A1* | 5/2010 | Collas ..................... | G06Q 20/12 |
| | | | 705/26.1 |
| 2011/0251892 A1* | 10/2011 | Laracey ............. | G06Q 30/0253 |
| | | | 705/14.51 |

(Continued)

FOREIGN PATENT DOCUMENTS

| | | |
|---|---|---|
| CN | 101308557 A | 11/2008 |
| CN | 102882903 A | 1/2013 |

(Continued)

OTHER PUBLICATIONS

The State Intellectual Property Office of the People's Republic of China (SIPO) Office Action 2 for 201610060190.5 dated Jan. 16, 2019 16 Pages, No Translation provided, but includes a concise explanation.

(Continued)

*Primary Examiner* — Shih-Wei Kraft
(74) *Attorney, Agent, or Firm* — Anova Law Group, PLLC

(57) ABSTRACT

An event execution method includes executing a first event by a first application client logged in on a mobile terminal of a user by using a first account of the user to obtain first event result information, the first event result information indicating an account resource to be deducted, displaying the first event result information on a screen of a processing device, and requesting to execute a second event by using the processing device, the second event being to deduct an amount of resource from a second account associated with the first account.

23 Claims, 11 Drawing Sheets

(51) Int. Cl.
*G06Q 20/40* (2012.01)
*G06F 9/448* (2018.01)
*G06Q 20/04* (2012.01)

(56) References Cited

U.S. PATENT DOCUMENTS

| | | | | |
|---|---|---|---|---|
| 2012/0173351 A1* | 7/2012 | Hanson | ................ | G06Q 20/204 |
| | | | | 705/17 |
| 2013/0013499 A1* | 1/2013 | Kalgi | ..................... | G06Q 20/12 |
| | | | | 705/41 |
| 2014/0108108 A1* | 4/2014 | Artman | ............. | G06Q 30/0261 |
| | | | | 705/14.1 |
| 2014/0351072 A1* | 11/2014 | Wieler | ................ | G06Q 20/202 |
| | | | | 705/21 |

FOREIGN PATENT DOCUMENTS

| | | |
|---|---|---|
| CN | 103106576 A | 5/2013 |
| CN | 104077689 A | 10/2014 |
| CN | 104123637 A | 10/2014 |
| CN | 104463570 A | 3/2015 |
| CN | 104639554 A | 5/2015 |
| CN | 104680372 A | 6/2015 |
| CN | 104700271 A | 6/2015 |
| CN | 104767735 A | 7/2015 |
| CN | 105099688 A | 11/2015 |
| CN | 105718314 A | 6/2016 |

OTHER PUBLICATIONS

The State Intellectual Property Office of the People's Republic of China (SIPO) Office Action 1 for 201610060190.5 dated Jul. 31, 2018 16 Pages, No translation provided, but includes a concise explanation.

The World Intellectual Property Organization (WIPO) International Search Report for PCT/CN2017/071965 dated Apr. 26, 2017 5 Pages (including translation).

* cited by examiner

EVENT EXECUTION METHOD, DEVICE, AND SYSTEM

RELATED APPLICATION

This application claims priority to PCT Application No. PCT/CN2017/071965, filed on Jan. 20, 2017, which claims priority to Chinese Patent Application No. 2016100601905, entitled "EVENT EXECUTION METHOD, DEVICE, AND SYSTEM" filed on Jan. 28, 2016. Both applications are incorporated by reference in their entirety.

FIELD OF THE TECHNOLOGY

Embodiments of the present disclosure relate to the computer field, and more particularly to an event execution method, device, and system.

BACKGROUND OF THE DISCLOSURE

With the development of mobile Internet technologies, an increasingly large number of applications are ported from personal computers (PC) to mobile terminals. Although it is very convenient and fast to execute different events in an application by using mobile terminals, events in some applications are subject to various restrictions due to the mobile terminals. For example, as compared with a PC, a mobile terminal has a limited processing capability. Therefore, some applications only open processing rights of some events for a client installed on the mobile terminal. For example, the application may reject processing by the mobile terminal when an excessively large amount of data needs to be processed for the involved events.

Further, normal execution of these application events cannot be ensured when these applications only allow registration and login on a mobile terminal but not registration on a PC, or when a mobile terminal and a PC have different account systems and therefore an account registered on the mobile terminal cannot be logged in on the PC.

That is, methods for executing events by using mobile terminals provided in the related technology are subject to many restrictions, resulting in a problem that an event on a mobile terminal cannot be executed on a PC.

SUMMARY

Embodiments of the present disclosure provide an event execution method, device, and system, so as to at least resolve a technical problem in the related technology that an event on a mobile terminal cannot be executed on a processing device.

According to an aspect of the embodiments of the present disclosure, an event execution method is provided. The method includes: obtaining first event result information obtained by executing a first event by a first application client logged in on a mobile terminal by using a first account, the first event result information indicating an account resource to be deducted; displaying the first event result information on a screen of a processing device; and requesting to execute a second event by using the processing device, the second event being used for deducting an amount of resource from a second account associated with the first account.

According to another aspect of the embodiments of the present disclosure, an event execution method is provided. The method includes: executing a first event on a first application client logged in on a mobile terminal by using a first account; synchronizing first event result information obtained by executing the first event to a processing device, to enable the processing device to execute a second event, the first event result information indicating an account resource to be deducted, and the second event being used for deducting an amount of resource from a second account associated with the first account; and obtaining second event result information obtained by executing the second event.

According to still another aspect of the embodiments of the present disclosure, an event execution apparatus is further provided, the foregoing apparatus being located in a processing device. The apparatus comprises: an obtaining unit, configured to obtain first event result information obtained by executing a first event by a first application client logged in on a mobile terminal by using a first account, the first event result information indicating an account resource to be deducted; a display unit, configured to display the first event result information on a user interface of the processing device; and an execution unit, configured to request to execute a second event by using the processing device, the second event being used for deducting an amount of resource from a second account associated with the first account.

According to still another aspect of the embodiments of the present disclosure, an event execution system is further provided. The system comprises: a first execution unit, configured to execute a first event on a first application client logged in on the mobile terminal by using a first account; a synchronization unit, configured to synchronize first event result information obtained by executing the first event to a processing device, to enable the processing device to execute the second event, wherein the first event result information indicates an account resource to be deducted, and the second event is used for deducting an amount of resource from a second account associated with the first account; and a first obtaining unit, configured to obtain second event result information obtained by executing the second event.

In the embodiments of the present disclosure, a mobile terminal obtains and displays first event result information that is obtained by executing a first event by a first application client logged in on the mobile terminal by using a first account and indicates an account resource to be deducted, so that a processing device requests to execute (e.g., execute a second event) deduction, from an account resource of a second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device.

In addition, the first event result information is displayed at the processing device again, so that a user may confirm again the first event result information used for indicating the account resource to be deducted, thereby ensuring the security of account resources, and reducing a probability that an account resource is incorrectly deducted because of a mis-operation on the mobile terminal, so as to achieve an effect of improving the accuracy of event execution.

Further, the processing device may further request in time, according to the displayed first event result information, to deduct, from the second account, the account resource to be deducted, thereby ensuring the execution efficiency of executing the second event by the processing device.

BRIEF DESCRIPTION OF THE DRAWINGS

The accompanying drawings shown herein are provided for further understanding of the present disclosure, and constitute a part of the present application, and the exemplary embodiments of the present disclosure and its description are used for explaining the present disclosure, but do not constitute improper limitations to the present disclosure. In the accompanying drawings.

DESCRIPTION OF EMBODIMENTS

Figure 1:
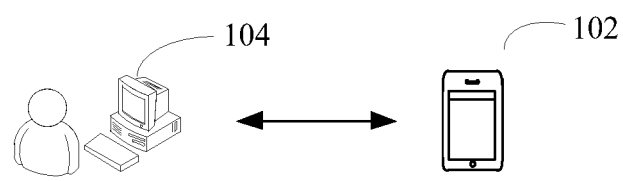
FIG. 1 is a schematic diagram of an application environment of an optional event execution method according to an embodiment of the present disclosure.

To make the solutions of the present disclosure clearer and more comprehensible to persons skilled in the art, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

It should be noted that the terms "first" and "second" in the specification, the claims, and the accompanying drawings of the present disclosure are used only to differentiate similar objects, and do not describe a specific relationship or sequence therebetween. It is to be understood that the terms so used are interchangeable under appropriate circumstances such that the embodiments of the present disclosure described herein can be implemented in sequences other than those illustrated or otherwise described herein. Moreover, the terms "include", "comprise", and any variants thereof are intended to cover a non-exclusive inclusion, such that a process, method, system, product, or device that includes a series of steps or units is not necessarily limited to those steps and units expressly listed, but may include other steps or units not expressly listed or inherent to such process, method, product, or device.

According to this embodiment of the present disclosure, an embodiment of an event execution method is provided. A processing device 104 obtains first event result information obtained by executing a first event by a first application client logged in on a mobile terminal 102 by using a first account. The first event result information indicates an account resource to be deducted, and displays first event result information on a user interface of the processing device 104. Further, the processing device 104 is used for requesting to execute a second event used for deducting a certain amount of resource from a second account associated with the first account. The account resource may refer to money, or other payment currencies.

Optionally, in this embodiment, the mobile terminal may include at least one of the following: a mobile phone and a tablet computer. The processing device may include at least one of the following: a laptop computer, a tablet computer, a desktop computer, and another hardware device configured to receive information transmitted by the mobile terminal and configured to execute a payment function. The mobile terminal may be a terminal having an online banking function. The processing device may be a PC. The foregoing is only an example. This is not limited in any way in this embodiment.

It should be noted that, a large amount of payment means a payment manner involving an amount above a specified amount. In this embodiment, the specified amount is not limited, and may be an amount specified by a third party such as the bank or government body, or may be set by a user or a merchant.

Optionally, in this embodiment, the foregoing event execution method may not be limited to the application to an application environment shown in FIG. 1. The processing device 104 obtains, through a wireless connection, from the mobile terminal 102 on which the first account is used for logging in, the first event result information obtained by executing the first event by the first application client. Therefore, the first event result information to be displayed is obtained rapidly, and the first event result information is displayed in time on the screen of the processing device, so as to facilitate execution of the second event by using the processing device, thereby achieving the objective of improving event execution efficiency.

Figure 2:
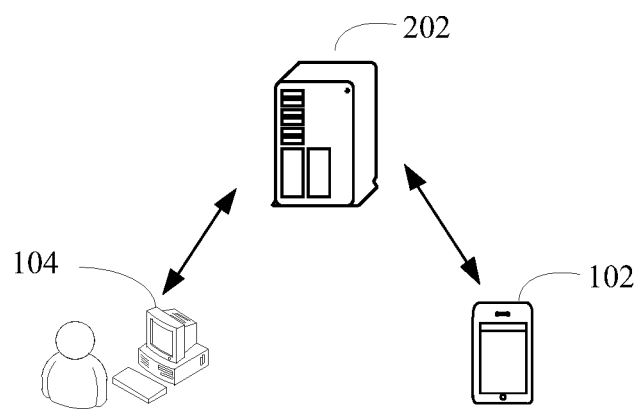
FIG. 2 is a schematic diagram of an application environment of another optional event execution method according to an embodiment of the present disclosure.

Optionally, in this embodiment, the foregoing event execution method may not be limited to the application to an application environment shown in FIG. 2. The processing device 104 obtains, by using a server 202, the first event result information obtained by executing the first event by the first application client logged in on the mobile terminal 102 by using the first account. That is, the first event result information may be recorded and stored in the server 202. Therefore, the server sends the first event result information to the processing device, e.g., a PC, so as to ensure use security of the first event result information.

Figure 3:
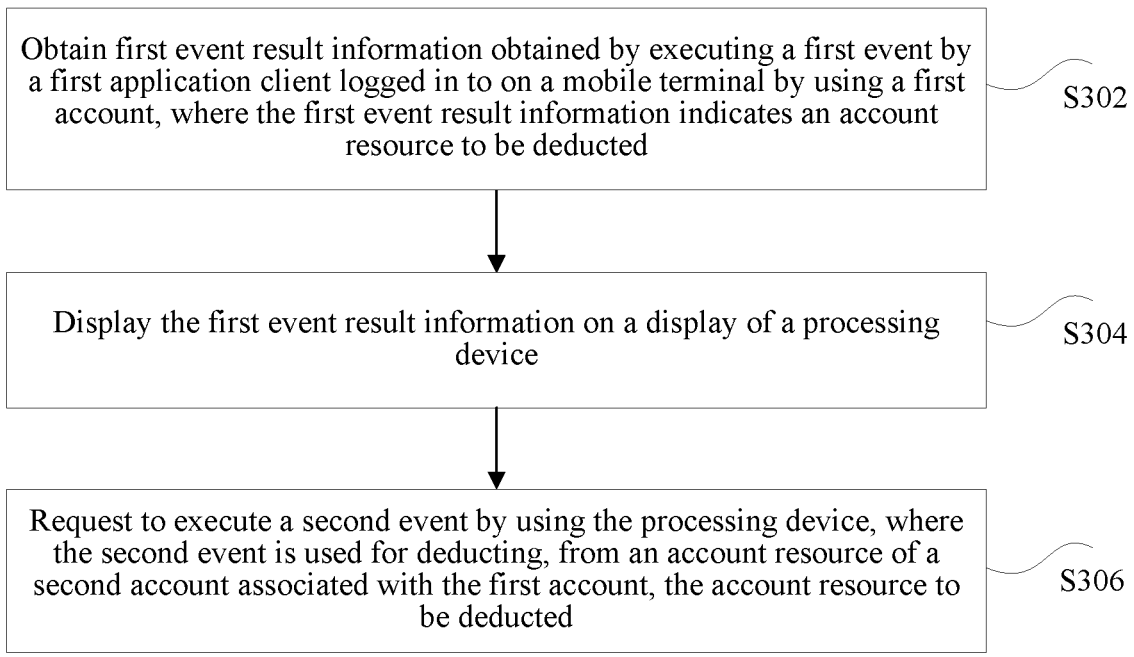
FIG. 3 is a flowchart of an optional event execution method according to an embodiment of the present disclosure.

According to this embodiment of the present disclosure, an event execution method is provided. As shown in FIG. 3, the method includes the following steps:

S302: Obtain first event result information obtained by executing a first event by a first application client logged in on a mobile terminal by using a first account, where the first event result information indicates an account resource to be deducted.

S304: Display the first event result information on a user interface of a processing device.

S306: Request to execute a second event by using the processing device, where the second event is used for deducting a certain amount of resource from a second account associated with the first account.

In some embodiment, the foregoing event execution method may not be limited to the application of a process of using the mobile terminal to execute an application event. For example, the first application client may be a shopping application client, the first event may be a shopping operation, the corresponding first event result information may be an order, and the second event may be a payment order. In the foregoing method, the shopping application client on the mobile terminal may be configured to execute a shopping event. Specifically, after a first account ID-1 is used for logging in to the shopping application client on the mobile terminal, and the shopping application client may execute the shopping event (e.g., an operation of adding a commodity to be purchased to a shopping cart), and obtain an order Tip-1. The processing device may obtain order Tip-1 and display order Tip-1 on the screen of the processing device. Further, the processing device may request a payment platform to pay for the order, so as to deduct, from an account resource (e.g., an asset) of a second account ID-2 associated with the first account ID-1, an account resource to be deducted (e.g., a payment amount) indicated by order Tip-1. The foregoing is only an example and not intended to limit in any way the embodiments of the present disclosure.

In the foregoing example, the first event result information displayed on the screen of the processing device may include at least one of the following: a user account name, an account resource to be deducted, and an event description, for example, an order account name, an order amount, and an order description. Optionally, this embodiment may not be limited to triggering to execute the second event when the account resource to be deducted is greater than or equal to a predetermined threshold.

It should be noted that, in this embodiment, a processing device may obtain first event result information obtained by executing a first event by a first application client logged in on a mobile terminal by using a first account, where the first event result information indicates an account resource to be deducted; the first event result information is displayed on a user interface of the processing device; and further, the processing device requests to execute a second event used for deducting a certain amount of resource from a second account associated with the first account. That is, in this embodiment, the mobile terminal obtains and displays the first event result information that is obtained by executing the first event by the first application client logged in on the mobile terminal by using the first account and indicates the account resource to be deducted, so that the processing device requests to execute (e.g., execute the second event) deduction, from the account resource of the second account, the account resource to be deducted indicated by the first event result information obtained by the mobile terminal, so as to use the processing device in place of the mobile terminal to complete an event to be executed by the mobile terminal. This overcomes a problem in the related technology that an event on the mobile terminal cannot be executed on the processing device. In addition, the first event result information may be displayed at the processing device again, so that a user may confirm again the first event result information used for indicating the account resource to be deducted, thereby ensuring the security of account resources, and reducing the probability that an account resource is incorrectly deducted because of a mis-operation on the mobile terminal, and achieve an effect of improving the accuracy of event execution. Further, the processing device may further request in time, according to the displayed first event result information, to deduct, from the second account, the account resource to be deducted, thereby ensuring the execution efficiency of executing the second event by the processing device.

Optionally, in this embodiment, the first event result information may be directly buffered on the mobile terminal, or may be stored in a backend server, making it convenient for the processing device to obtain the first event result information and display the first event result information and convenient to execute the second event in time by using the processing device. Therefore, while the security of event result information is ensured, the objective of improving event execution efficiency can further be achieved.

Optionally, in this embodiment, the first application client logged in on the mobile terminal and an application logged in one the screen displayed by the processing device may be the same application or may be different applications. This is not limited in this embodiment.

For example, a purchase payment is still used as an example, the first application client logged in on the mobile terminal may be a shopping application client, and an application logged in one the screen displayed by the processing device may be a third-party payment application client. That is, even if the first application client and the application logged in one the screen have different account systems, by means of the method provided in this embodiment, the first event result information in the first application client may be displayed on the screen of the processing device, so that the processing device may be used in place of the mobile terminal to execute a shopping payment event that needs to be executed on the mobile terminal.

Optionally, in this embodiment, the obtaining first event result information obtained by executing a first event by a first application client logged in on a mobile terminal by using a first account may include one of the following steps:

1) Directly obtain a first Uniform Resource Locator (URL) matching the first event result information and returned by the mobile terminal, where the first URL at least includes a first event result identifier, so as to display the first event result information on the screen of the processing device by using the first event result identifier.

2) Display resource obtaining prompt information at the processing device, where the resource obtaining prompt information is used for indicating a resource obtaining identifier, and detect whether an account associated with the resource obtaining identifier exists, where the account is the first account of the first application client, to obtain at least one piece of event result information in the detected first account.

3) Detect, by using the processing device, whether the first event result information exists in the first account having an association relationship with a third account; and obtain the first event result information when it is detected that the first event result information exists, where the third account is used for logging in to the screen of the processing device, and the association relationship exists between the first account and the third account.

It should be noted that, in this embodiment, before the first event result information is obtained, the method may further include: establishing in advance an association relationship between the first account and the third account, that is, obtaining in advance the first account used for logging in to the first application client on the mobile terminal and the third account used for logging in on the corresponding page of the processing device, and establishing the association relationship between the first account and the third account, making it convenient for the processing device to detect, one the screen to which the third account is used for logging in, whether the first account having the association relationship with the third account exists. Therefore, the at least one piece of event result information in the first account is obtained when the first account is detected. The at least one piece of event result information includes the first event result information.

Optionally, in this embodiment, before the obtaining the first event result information, the method may further include: logging in to the first application client on the mobile terminal by using the first account; and executing the first event on the first application client and obtaining the first event result information.

Figure 4:
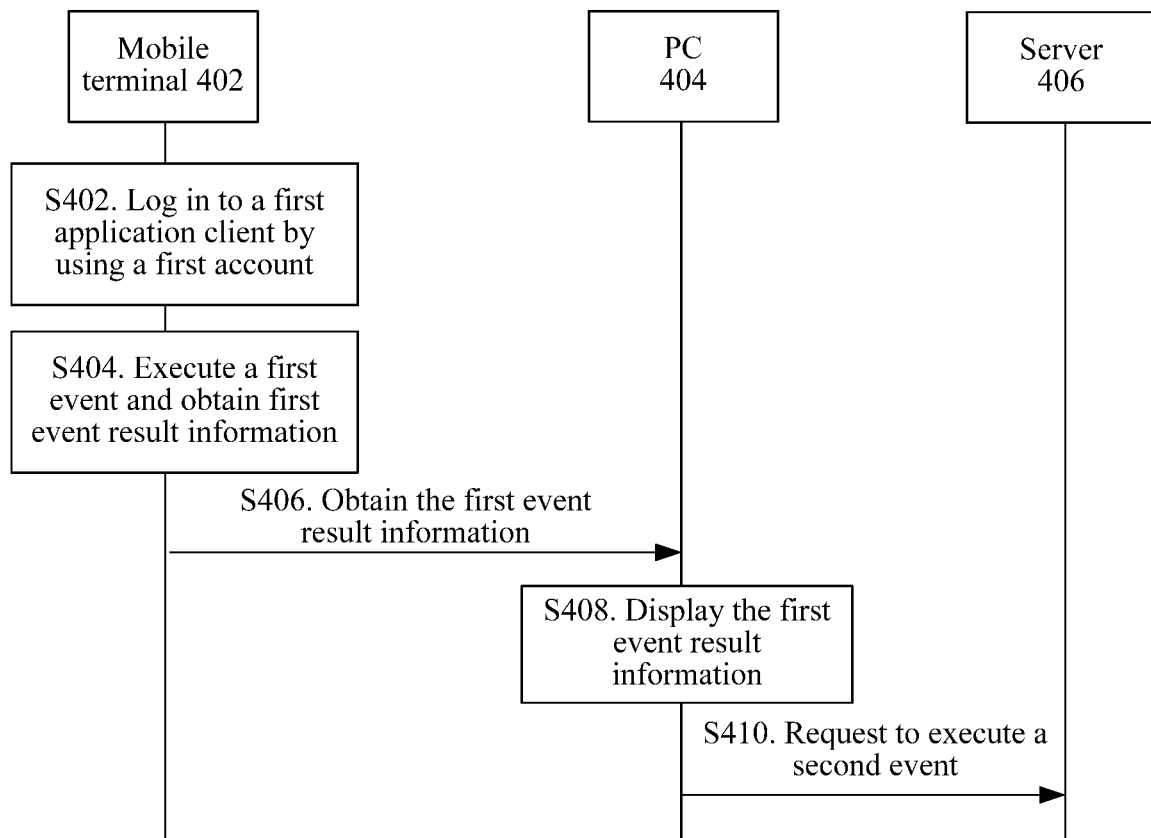
FIG. 4 is a flowchart of another optional event execution method according to an embodiment of the present disclosure.

Details are described with reference to step S402 to step S410 in FIG. 4. For example, the processing device may be a PC 404. The first account (e.g., ID-1) may be used for logging in to the first application client (e.g., a shopping application client) on a mobile terminal 402. The PC 404 may execute the first event (e.g., placement of a purchase order) on the first application client (e.g., the shopping application client), and obtains the first event result information (e.g., an order Tip-1). After obtaining the first event result information from the mobile terminal 402, the PC 404 may display the first event result information on a user interface of the PC 404, making it convenient to confirm the first event result information again. Further, the PC 404 may request a server 406 (e.g., a payment platform server) to execute the second event, where the second event is used for deducting, from an account resource (e.g., an asset) of a second account (e.g., an ID-2) associated with the first account (e.g., ID-1), an account resource to be deducted (e.g., a payment amount).

In embodiments of the present disclosure, a mobile terminal obtains and displays first event result information that is obtained by executing a first event by a first application client logged in on the mobile terminal by using a first account and indicates an account resource to be deducted, so that a processing device requests to execute (e.g., execute a second event) deduction, from an account resource of a second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device.

In one embodiment, the displaying the first event result information on a user interface of a processing device includes the following steps:

S1: Obtain a first URL matching the first event result information, where the first URL at least includes a first event result identifier.

S2: Display the first event result information on the screen of the processing device according to the first event result identifier.

Optionally, in this embodiment, the first URL may not be limited to a URL that is obtained after the first application client on the mobile terminal executes the first event and matches the first event result information of the first event. For example, shopping payment is still used as an example, and the first event result identifier included in the first URL may not be limited to an order number. For example, the first URL may be as follows:

qian.tenpay.com?list=order number

Optionally, in this embodiment, the displaying the first event result information on the screen of the processing device according to the first event result identifier may include: inputting the first URL obtained by the mobile terminal to the screen of the processing device, searching for the corresponding first event result information according to the first event result identifier in the first URL, and displaying the first event result information on the screen of the processing device.

Figure 5:
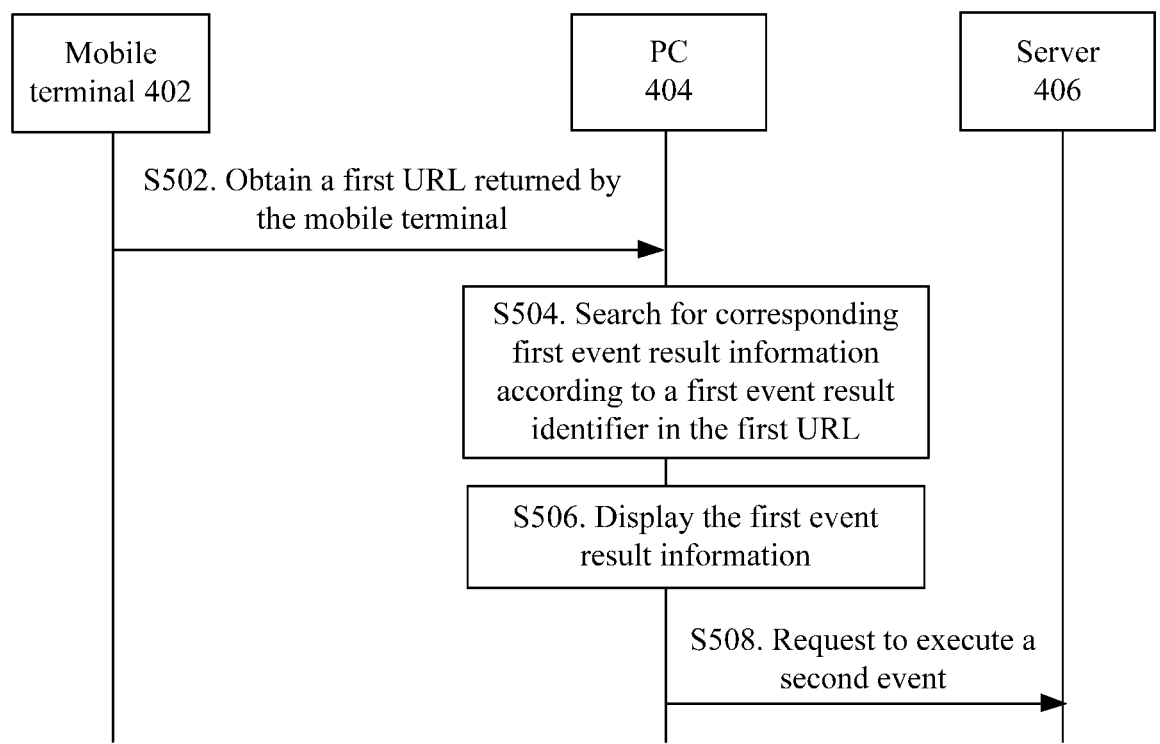
FIG. 5 is a flowchart of still another optional event execution method according to an embodiment of the present disclosure.

Details are described with reference to step S502 to step S508 shown in FIG. 5. For example, the processing device may be a PC 404. The PC 404 may obtain the returned first URL from the mobile terminal 402, where the first URL at least includes the first event result identifier (e.g., an order number). The PC 404 may search for the corresponding first event result information according to the first event result identifier in the first URL, and after finding the corresponding first event result information (e.g., an order Tip-1), displays the first event result information on a user interface of the PC. Further, the PC 404 triggers (e.g., triggers by using a trigger button) to request a server 406 (e.g., a payment platform server) to execute the second event.

In embodiments of the present disclosure, a first event result identifier used for identifying first event result information is built in a first URL, and the first URL is further input on a processing device. Therefore, a characteristic of a URL is used for displaying the first event result information in time on a user interface of the processing device, making it convenient to use the first event result information to rapidly execute a second event, thereby achieving an objective of improving event execution efficiency. In addition, a user may further confirm again the displayed first event result information indicating an account resource to be deducted, thereby ensuring the security of account resources.

In one embodiment, the obtaining first event result information obtained by executing a first event by a first application client logged in on a mobile terminal by using a first account includes the following steps:

S1: Display resource obtaining prompt information at the processing device, where the resource obtaining prompt information is used for indicating a resource obtaining identifier.

S2: Detect, by using the processing device, whether an account associated with the resource obtaining identifier exists, where the account is the first account of the first application client.

S3: Obtain at least one piece of event result information in the first account by using the processing device if the first account associated with the resource obtaining identifier is detected, where the at least one piece of event result information includes the first event result information.

Optionally, in this embodiment, the resource obtaining prompt information may not be limited to a barcode. The barcode in this embodiment may include at least one of the following: a two-dimensional barcode and a linear barcode. Optionally, in this embodiment, the resource obtaining identifier may not be limited to a unique random number.

Optionally, in this embodiment, before the displaying resource obtaining prompt information at the processing device, the method may further include: displaying a page corresponding to a predetermined URL on the screen of the processing device. Further, the resource obtaining prompt information is displayed one the screen corresponding to the predetermined URL.

It should be noted that, in this embodiment, the predetermined URL may not be limited to including no first event result information, and therefore fewer characters are used compared with the first URL in the foregoing embodiments.

Optionally, in this embodiment, before the executing the second event, the method may include: selecting, from the at least one piece of event result information, the first event result information to be executed; or may include: selecting to execute all event result information. This is not limited in this embodiment.

Figure 6:
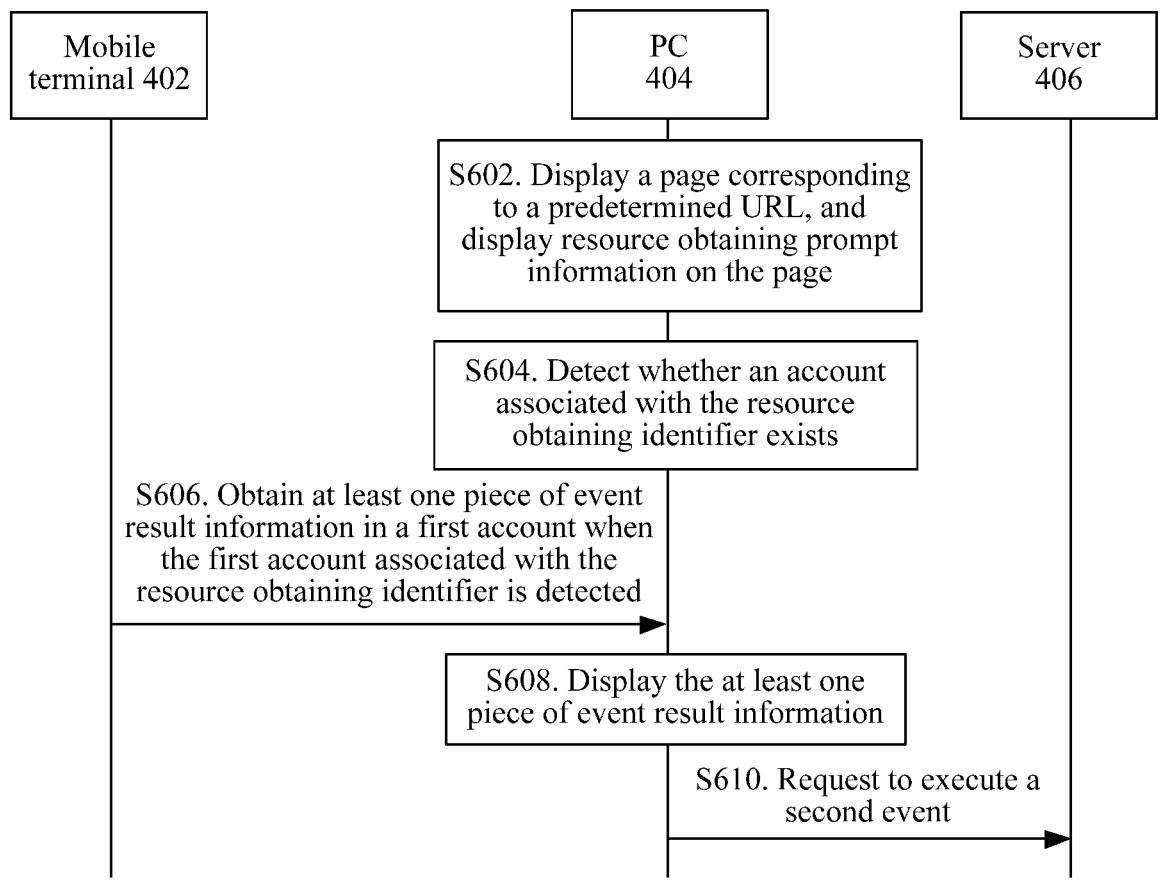
FIG. 6 is a flowchart of still another optional event execution method according to an embodiment of the present disclosure.

Details are described with reference to step S602 to step S610 shown in FIG. 6. For example, the processing device may be a PC 404. The PC 404 may display a page corresponding to a predetermined URL, and displays resource obtaining prompt information (e.g., a two-dimensional barcode) one the screen, where the resource obtaining prompt information is used for indicating the resource obtaining identifier (e.g., an identifier token-1). The PC 404 may detect whether an account associated with the resource obtaining identifier (e.g., the identifier token-1) exists (e.g., detect whether a two-dimensional barcode displayed after scanning by the mobile terminal exists), where the account is the first account (e.g., ID-1) used for logging in to the first application client on the mobile terminal 402. The PC 404 may obtain the at least one piece of event result information in the first account (e.g., ID-1) when the first account (e.g., ID-1) associated with the resource obtaining identifier (e.g., the identifier token-1) is detected, where the at least one piece of event result information includes the first event result information (e.g., an order Tip-1), and display the at least one piece of event result information one the screen of the PC. Further, the PC 404 may request a server 406 (e.g., a payment platform server) to execute the second event.

In embodiments of the present disclosure, resource obtaining prompt information used for indicating a resource obtaining identifier is displayed on a processing device, and it is further detected by using the processing device whether an account associated with the resource obtaining identifier exists, where the account includes a first account, so that at least one piece of event result information in the first account is obtained when an account associated with the resource obtaining identifier is detected. Therefore, the resource obtaining prompt information is provided to detect whether an associated account exists, so as to obtain event result information in the detected account, making it convenient to execute a second event by using the obtained event result information.

In one embodiment, the displaying resource obtaining prompt information at the processing device includes the following steps:

S1: Randomly generate the resource obtaining identifier at the processing device.

S2: Encode the resource obtaining identifier into a barcode, to obtain the resource obtaining prompt information.

Optionally, in this embodiment, the resource obtaining identifier may not be limited to a randomly-generated unique random number. Further, the unique random number is encoded into a barcode, to obtain the resource obtaining prompt information used for being displayed at the processing device. That is, the resource obtaining prompt information (e.g., the barcode) displayed by the processing device is provided for a mobile terminal to perform scanning. After the mobile terminal detects the resource obtaining prompt information (e.g., the barcode) (e.g., the mobile terminal successfully obtains the resource obtaining prompt information through the scanning), an association relationship may be established between the first event result information on the mobile terminal and the resource obtaining identifier. In this way, the processing device may find the first event result information according to the resource obtaining identifier and display the first event result information.

In embodiments of the present disclosure, resource obtaining prompt information used for indicating a resource obtaining identifier may be generated on a processing device, to enable a mobile terminal to rapidly provide first event result information to the processing device, thereby displaying the first event result information on a user interface of the processing device in time, making it convenient for the processing device to rapidly execute a second event, thereby achieving an objective of improving-event execution efficiency.

In one embodiment, a third account is used for logging in to the screen of the processing device, an association relationship exists between the first account and the third account, and the obtaining first event result information obtained by executing a first event by a first application client logged in on a mobile terminal by using a first account includes the following steps:

S1: Detect, by using the processing device, whether the first event result information exists in the first account having the association relationship with the third account.

S2: Obtain the first event result information obtained by executing the first event by the first application client logged in on the mobile terminal by using the first account if it is detected that the first event result information exists.

Optionally, in this embodiment, before the detecting, by using the processing device, whether the first event result information exists in the first account having the association relationship with the third account, the method may further include: obtaining in advance the first account used for logging in to the first application client on the mobile terminal and the third account used for logging in on the corresponding page of the processing device; and establishing the association relationship between the first account and the third account.

Optionally, in this embodiment, the detecting, by using the processing device, whether the first event result information exists in the first account having the association relationship with the third account may include: performing detection and scanning periodically to determine whether the first event result information exists in the first account having the association relationship with the third account.

Figure 7:
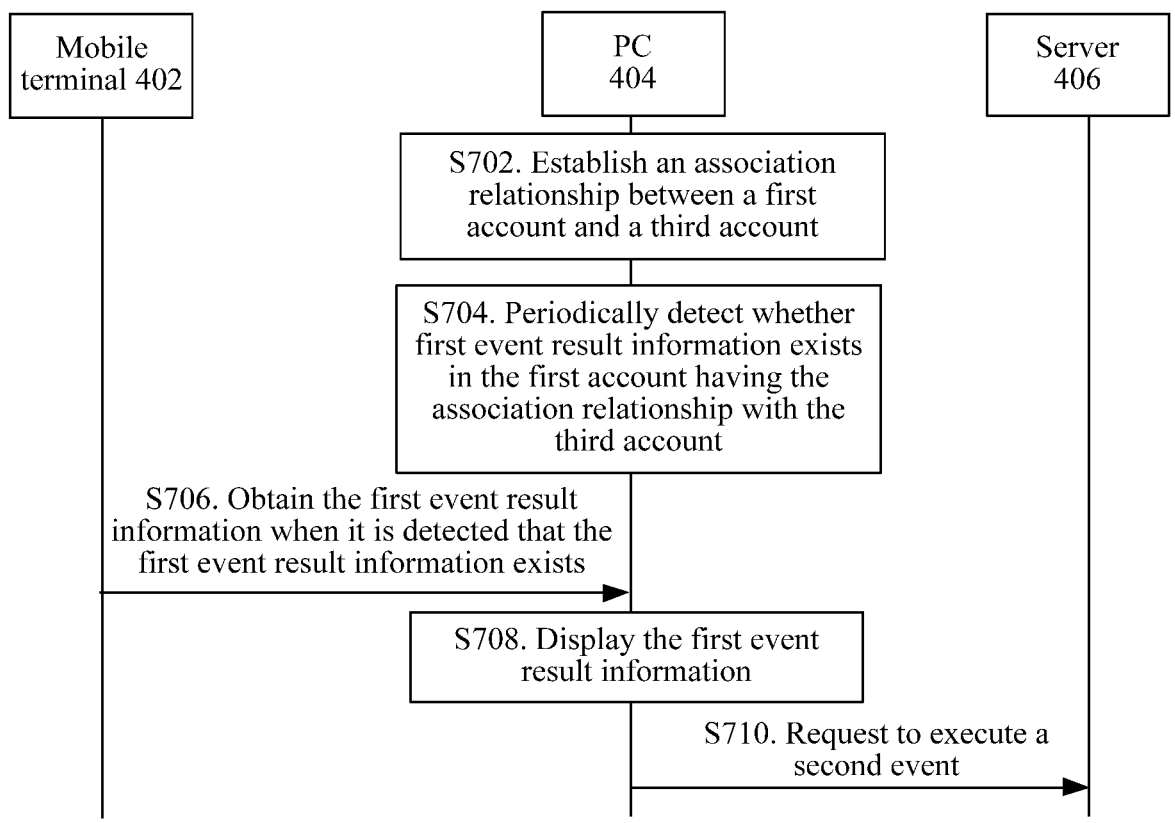
FIG. 7 is a flowchart of still another optional event execution method according to an embodiment of the present disclosure.

Details are described with reference to step S702 to step S710 in FIG. 7. For example, the processing device is a PC 404. The PC 404 establishes an association relationship between the first account (e.g., ID-1) and the third account (e.g., ID-3). The PC periodically detects whether the first event result information (e.g., an order Tip-1) exists in the first account (e.g., ID-1) having the association relationship with the third account (e.g., ID-3). The PC obtains the first event result information when it is detected that the first event result information exists in the first account (e.g., ID-1), and displays the first event result information on a user interface of the PC. Further, the PC 404 requests a server 406 (e.g., a payment platform server) to execute the second event.

In embodiments of the present disclosure, an association relationship between a first account used for logging in to a first application client on a mobile terminal and a third account used for logging in to a user interface of a processing device is established in advance, making it convenient for the processing device to detect and obtain in time event result information in the first account having the association relationship with the third account, so that the processing device may display the event result information one the screen in time, to enable the processing device to request in time, according to the displayed event result information, to execute a second event, thereby achieving an effect of improving the execution efficiency of executing the second event by the processing device.

In one embodiment, the requesting, by using the processing device, to execute the second event includes:

S1: Receive a trigger operation on a trigger button displayed on the screen of the processing device, where the trigger button is used for triggering execution of the second event.

Figure 8:
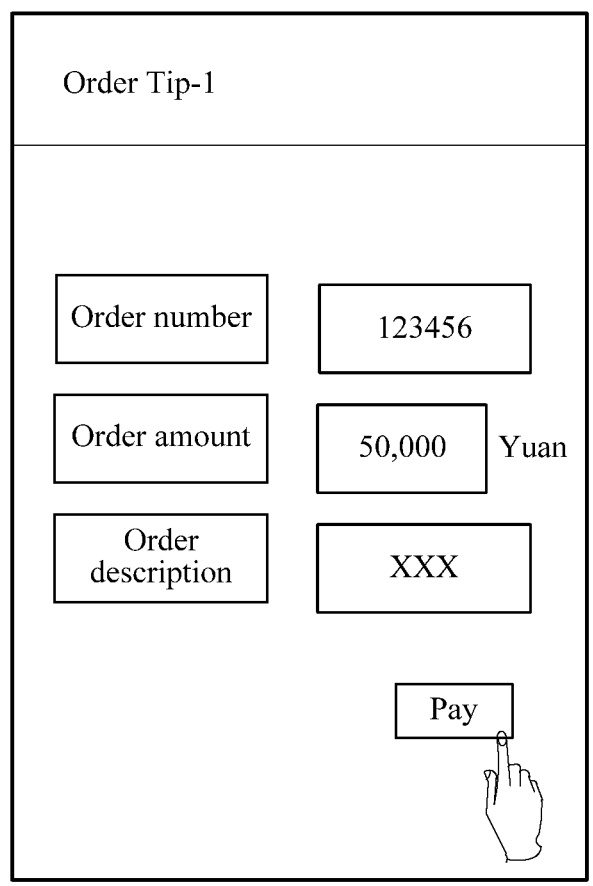
FIG. 8 is a schematic diagram of an optional event execution method according to an embodiment of the present disclosure.

Optionally, in this embodiment, the screen of the processing device may further include a trigger button used for triggering execution of the second event. For example, shopping payment is still used as an example, and first event result information is an order Tip-1 shown in FIG. 8, and specifically includes: an order number, an order amount, and order description. The trigger button may be the button "Pay" shown in FIG. 8. For example, it may be triggered that the processing device executes the second event when an order amount (e.g., "50,000 yuan") is greater than a predetermined amount (e.g., "20,000 yuan"). That is, the processing device may be configured to pay the order amount (e.g., "50,000 yuan") for shopping. Optionally, in this embodiment, the trigger operation may not be limited to: a click operation, a voice operation, and the like.

It should be noted that, in this embodiment, the second account associated with the first account in the second event may include one or more accounts. For example, shopping payment is still used as an example, and a login account of a shopping application may not be limited to having an association relationship with one or more payment accounts.

In embodiments of the present disclosure, a trigger button may be set on a user interface of a processing device, to enable the processing device to receive a trigger operation on the trigger button to trigger execution of a second event, so as to avoid a mis-operation on the second event, and further avoid a mis-operation on an account resource, thereby achieving an objective of ensuring the security of account resources.

It should be noted that the foregoing method embodiments are illustrated as a series of action combinations for ease of description; however, a person skilled in the art should know that the present disclosure is not limited to the described order of actions, because based on the present disclosure, some steps may be performed in another order or at the same time. Next, a person skilled in the art should know that the embodiments described in the specification are all preferred embodiments, and the involved actions and modules are not necessarily required in the present disclosure.

Through the above description of the implementation, it is clear to persons skilled in the art that the methods in the foregoing embodiments may be accomplished through hardware, or through software plus a necessary universal hardware platform. Based on this, the technical solution of the present disclosure or the part that makes contributions to the related technology may substantially be embodied in the form of a software product. The computer software product may be stored in a storage medium (e.g., a read-only memory (ROM)/random-access memory (RAM), a Universal Serial Bus (USB) flash drive, a magnetic disk or an optical disc) and contain several instructions adapted to instruct computer equipment (e.g., a mobile phone, a computer, a server, or network equipment) to perform the method according to the embodiments of the present disclosure.

Figure 9:
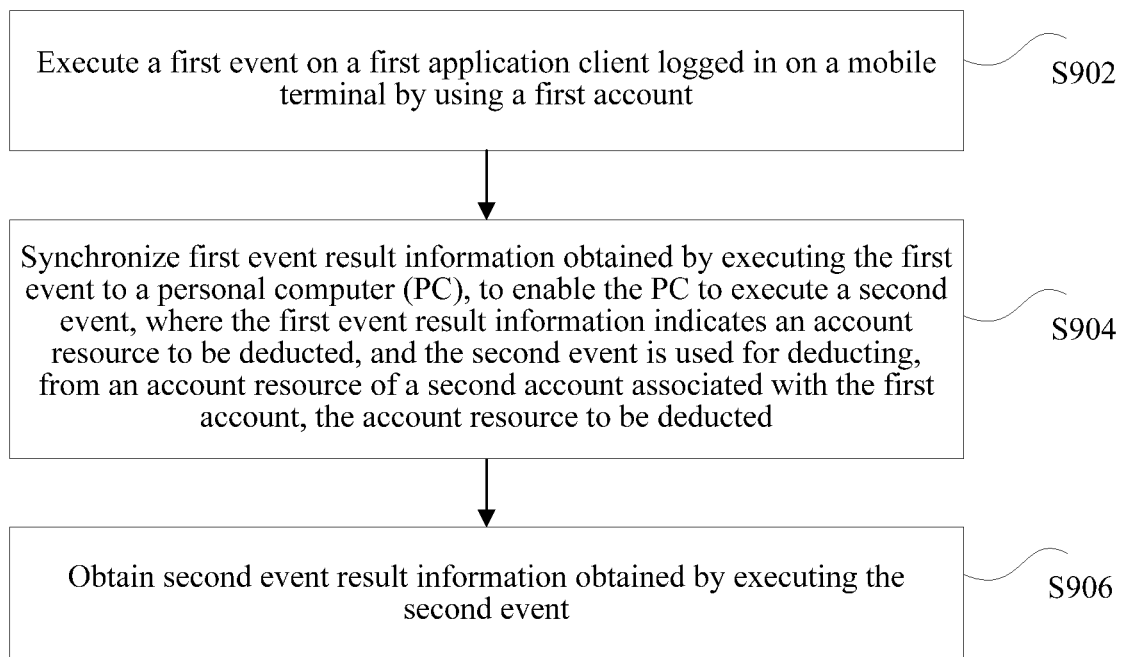
FIG. 9 is a flowchart of still another optional event execution method according to an embodiment of the present disclosure.

According to this embodiment of the present disclosure, an event execution method is provided. As shown in FIG. 9, the method includes the following steps:

S902: Execute a first event on a first application client logged in on a mobile terminal by using a first account.

S904: Synchronize first event result information obtained by executing the first event to a processing device, to enable the processing device to execute a second event, where the first event result information indicates an account resource to be deducted, and the second event is used for deducting a certain amount of resource from a second account associated with the first account.

S906: Obtain second event result information obtained by executing the second event.

Optionally, in this embodiment, the foregoing event execution method may not be limited to the application of a process of using the mobile terminal to execute an application event. For example, the first application client is a shopping application client, the first event is a shopping operation, the corresponding first event result information is an order, and the second event is a payment order. In the foregoing method, the shopping application client on the mobile terminal may be used for executing a shopping event. Specifically, after a first account ID-1 is used for logging in to the shopping application client on the mobile terminal, and the shopping application client executes the shopping event (e.g., an operation of adding a commodity to be purchased to a shopping cart), and obtains an order Tip-1. The processing device obtains order Tip-1 and displays order Tip-1 on the screen of the processing device. Further, the processing device requests a payment platform to pay for the order, so as to deduct, from an account resource (e.g., an asset) of a second account ID-2 associated with the first account ID-1, an account resource to be deducted (e.g., a payment amount) indicated by order Tip-1. The foregoing is only an example. This is not limited in any way in this embodiment.

In the foregoing example, the first event result information displayed on the screen of the processing device may include at least one of the following: a user account name, an account resource to be deducted, and an event description, for example, an order account name, an order amount, and an order description. Optionally, this embodiment may not be limited to triggering to execute the second event when the account resource to be deducted is greater than or equal to a predetermined threshold.

It should be noted that, in this embodiment, a first application client is logged in on a mobile terminal by using a first account executes a first event; first event result information obtained by executing the first event is synchronized to a processing device, to enable the processing device to execute a second event, where the first event result information indicates an account resource to be deducted, and the second event is used for deducting a certain amount of resource from a second account associated with the first account; and second event result information obtained by executing the second event is obtained, so that the processing device requests to execute (e.g., execute the second event) deduction, from the account resource of the second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device. In addition, the first event result information is displayed at the processing device again, so that a user may confirm again the first event result information used for indicating the account resource to be deducted, thereby ensuring the security of account resources, and reducing a probability that an account resource is incorrectly deducted because of a mis-operation on the mobile terminal, so as to achieve an effect of improving the accuracy of event execution. Further, the processing device may further request in time, according to the displayed first event result information, to deduct, from the second account, the account resource to be deducted, thereby ensuring the execution efficiency of executing the second event by the processing device.

Optionally, in this embodiment, the first event result information may be directly buffered on the mobile terminal, or may be stored in a backend server, making it convenient for the processing device to obtain the first event result information and display the first event result information and convenient to execute the second event in time by using the processing device. Therefore, while the security of event result information is ensured, the objective of improving event execution efficiency can further be achieved.

Optionally, in this embodiment, the first application client logged in on the mobile terminal and an application logged in on the screen displayed by the processing device may be the same application or may be different applications. This is not limited in this embodiment.

Optionally, in this embodiment, the synchronizing first event result information obtained by executing the first event to a processing device includes one of the following steps:

1) Synchronize a first URL matching the first event result information from the first application client to the processing device, where the first URL at least includes a first event result identifier, and the first event result identifier is used for instructing the processing device to obtain the first event result information.

2) Scan a barcode displayed at the processing device by using the first application client, and synchronize association information to the processing device, to enable the processing device to obtain the first event result information of the first account according to the association information, where the association information is used for indicating that the first account is associated with a resource obtaining identifier represented by the barcode.

3) Synchronize, by using the first application client, the first event result information to the processing device on which a third account is used for logging in, where an association relationship exists between the first account and the third account.

Optionally, in this embodiment, after the first event result information is obtained, the method further includes the following steps:

S1. Obtain the first event result information by using the processing device, and display the first event result information on the screen of the processing device.

S2. Request, by using the processing device, to execute the second event.

In embodiments of the present disclosure, a first application client is logged in on a mobile terminal by using a first account executes a first event; first event result information obtained by executing the first event is synchronized to a processing device, to enable the processing device to execute a second event, where the first event result information indicates an account resource to be deducted, and the second event is used for deducting a certain amount of resource from a second account associated with the first account; and second event result information obtained by executing the second event is obtained, so that the processing device requests to execute (e.g., execute the second event) deduction, from the account resource of the second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device.

In one embodiment, the synchronizing first event result information obtained by executing the first event to a processing device includes step S1 or S2 or S3.

S1: Synchronize a first URL matching the first event result information from the first application client to the processing device, where the first URL at least includes a first event result identifier, and the first event result identifier is used for instructing the processing device to obtain the first event result information.

Optionally, in this embodiment, the first URL may not be limited to a URL that is obtained after the first application client on the mobile terminal executes the first event and matches the first event result information of the first event. For example, shopping payment is still used as an example, and the first event result identifier included in the first URL may not be limited to an order number. For example, the first URL may be as follows:

qian.tenpay.com?list=order number

Optionally, in this embodiment, the displaying the first event result information on the screen of the processing device according to the first event result identifier may include: inputting the first URL obtained by the mobile terminal to the screen of the processing device, searching for the corresponding first event result information according to the first event result identifier in the first URL, and displaying the first event result information on the screen of the processing device.

S2: Scan a barcode displayed at the processing device by using the first application client, and synchronize association information to the processing device, to enable the processing device to obtain the first event result information of the first account according to the association information, where the association information is used for indicating that the first account is associated with a resource obtaining identifier represented by the barcode.

Optionally, in this embodiment, the resource obtaining prompt information may not be limited to a barcode. The resource obtaining identifier may not be limited to a unique random number.

Optionally, in this embodiment, before the displaying resource obtaining prompt information at the processing device, the method may further include: displaying a page corresponding to a predetermined URL on the screen of the processing device. Further, the resource obtaining prompt information is displayed one the screen corresponding to the predetermined URL.

S3: Synchronize, by using the first application client, the first event result information to the processing device on which a third account is used for logging in, where an association relationship exists between the first account and the third account.

Optionally, in this embodiment, the detecting, by using the processing device, whether the first event result information exists in the first account having the association relationship with the third account may include: performing detection and scanning periodically to determine whether the first event result information exists in the first account having the association relationship with the third account.

In one embodiment, the displaying the first event result information on the screen of the processing device includes the following steps:

S1: Obtain a first URL matching the first event result information, where the first URL at least includes a first event result identifier.

S2: Display the first event result information on the screen of the processing device according to the first event result identifier.

Details are described with reference to step S502 to step S508 shown in FIG. 5. For example, the processing device is a PC 404. The PC 404 obtains the returned first URL from a mobile terminal 402, where the first URL at least includes the first event result identifier (e.g., an order number). The PC 404 searches for the corresponding first event result information according to the first event result identifier in the first URL, and after finding the corresponding first event result information (e.g., an order Tip-1), displays the first event result information on a user interface of the PC. Further, the PC 404 triggers (e.g., triggers by using a trigger button) to request a server 406 (e.g., a payment platform server) to execute the second event.

In embodiments of the present disclosure, a first event result identifier used for identifying first event result information is built in a first URL, and the first URL is further input on a processing device. Therefore, a characteristic of a URL is used for displaying the first event result information in time on a user interface of the processing device, making it convenient to use the first event result information to rapidly execute a second event, thereby achieving an objective of improving event execution efficiency. In addition, a user may further confirm again the displayed first event result information indicating an account resource to be deducted, thereby ensuring the security of account resources.

In one embodiment, the obtaining the first event result information includes the following steps:

S1: Display resource obtaining prompt information at the processing device, where the resource obtaining prompt information is used for indicating a resource obtaining identifier.

S2: Detect, by using the processing device, whether an account associated with the resource obtaining identifier exists, where the account is the first account of the first application client.

S3: Obtain at least one piece of event result information in the first account by using the processing device if the first account associated with the resource obtaining identifier is detected, where the at least one piece of event result information includes the first event result information.

Optionally, in this embodiment, the resource obtaining prompt information may not be limited to a barcode. The barcode in this embodiment may include at least one of the following: a two-dimensional barcode and a linear barcode. Optionally, in this embodiment, the resource obtaining identifier may not be limited to a unique random number.

Optionally, in this embodiment, before the displaying resource obtaining prompt information at the processing device, the method may further include: displaying a page corresponding to a predetermined URL on the screen of the processing device. Further, the resource obtaining prompt information is displayed one the screen corresponding to the predetermined URL.

Optionally, in this embodiment, before the executing the second event, the method may include: selecting, from the at least one piece of event result information, the first event result information to be executed; or may include: selecting to execute all event result information. This is not limited in this embodiment.

In embodiments of the present disclosure, resource obtaining prompt information used for indicating a resource obtaining identifier is displayed on a processing device, and it is further detected by using the processing device whether an account associated with the resource obtaining identifier exists, where the account includes a first account, so that at least one piece of event result information in the first account is obtained when an account associated with the resource obtaining identifier is detected. Therefore, the resource obtaining prompt information is provided to detect whether an associated account exists, so as to obtain event result information in the detected account, making it convenient to execute a second event by using the obtained event result information.

In one embodiment, the displaying resource obtaining prompt information at the processing device includes the following steps:

S1: Randomly generate the resource obtaining identifier at the processing device.

S2: Encode the resource obtaining identifier into a barcode, to obtain the resource obtaining prompt information.

Optionally, in this embodiment, the resource obtaining identifier may not be limited to a randomly-generated unique random number. Further, the unique random number is encoded into a barcode, to obtain the resource obtaining prompt information used for being displayed at the processing device. That is, the resource obtaining prompt information (e.g., the barcode) displayed by the processing device is provided for the mobile terminal to perform scanning. After the mobile terminal detects the resource obtaining prompt information (e.g., the barcode) (e.g., the mobile terminal successfully obtains the resource obtaining prompt information through the scanning), an association relationship may be established between the first event result information on the mobile terminal and the resource obtaining identifier. In this way, the processing device may find the first event result information according to the resource obtaining identifier and display the first event result information.

In embodiments of the present disclosure, resource obtaining prompt information used for indicating a resource obtaining identifier is generated on a processing device, to enable a mobile terminal to rapidly provide first event result information to the processing device, thereby displaying the first event result information on a user interface of the processing device in time, making it convenient for the processing device to rapidly execute a second event, thereby achieving an objective of improving-event execution efficiency.

In one embodiment, a third account is used for logging in to the screen of the processing device, an association relationship exists between the first account and the third account, and the obtaining first event result information obtained by executing a first event by a first application client logged in on a mobile terminal by using a first account includes the following steps:

S1: Detect, by using the processing device, whether the first event result information exists in the first account having the association relationship with the third account.

S2: Obtain the first event result information obtained by executing the first event by the first application client logged in on the mobile terminal by using the first account if it is detected that the first event result information exists.

Optionally, in this embodiment, before the detecting, by using the processing device, whether the first event result information exists in the first account having the association relationship with the third account, the method may further include: obtaining in advance the first account used for logging in to the first application client on the mobile terminal and the third account used for logging in on the corresponding page of the processing device; and establishing the association relationship between the first account and the third account.

In embodiments of the present disclosure, an association relationship between a first account used for logging in to a first application client on a mobile terminal and a third account used for logging in to a user interface of a processing device is established in advance, making it convenient for the processing device to detect and obtain in time event result information in the first account having the association relationship with the third account, so that the processing device may display the event result information one the screen in time, to enable the processing device to request in time, according to the displayed event result information, to execute a second event, thereby achieving an effect of improving the execution efficiency of executing the second event by the processing device.

In one embodiment, the requesting, by using the processing device, to execute the second event includes:

S1: Receive a trigger operation on a trigger button displayed on the screen of the processing device, where the trigger button is used for triggering execution of the second event.

Optionally, in this embodiment, the screen of the processing device further includes a trigger button used for triggering execution of the second event. It should be noted that, in this embodiment, the second account associated with the first account in the second event may include one or more accounts. For example, shopping payment is still used as an example, and a login account of a shopping application may not be limited to having an association relationship with one or more payment accounts.

In embodiments of the present disclosure, a trigger button is set on a user interface of a processing device, to enable the processing device to receive a trigger operation on the trigger button to trigger execution of a second event, so as to avoid a mis-operation on the second event, and further avoid a mis-operation on an account resource, thereby achieving an objective of ensuring the security of account resources.

Figure 10:
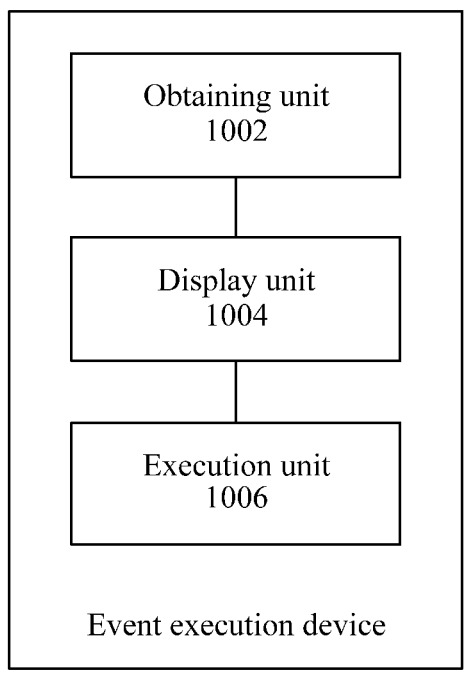
FIG. 10 is a schematic diagram of an optional event execution device according to an embodiment of the present disclosure.

According to this embodiment of the present disclosure, an event execution device configured to implement the foregoing event execution method is further provided. The foregoing device is located in a processing device. As shown in FIG. 10, the device includes:

1) an obtaining unit 1002, configured to obtain result information obtained by executing a first event by a first application client logged in on a mobile terminal by using a first account first event, where the first event result information indicates an account resource to be deducted;

2) a display unit 1004, configured to display the first event result information on a user interface of the processing device; and 3) an execution unit 1006, configured to request, by using the processing device, to execute the second event, where the second event is used for deducting a certain amount of resource from a second account associated with the first account.

Optionally, in this embodiment, the foregoing event execution device may not be limited to the application of a process of using the mobile terminal to execute an application event. For example, the first application client is a shopping application client, the first event is a shopping operation, the corresponding first event result information is an order, and the second event is a payment order. For the foregoing device, the shopping application client on the mobile terminal may be used for executing a shopping event. Specifically, after a first account ID-1 is used for logging in to the shopping application client on the mobile terminal, and the shopping application client executes the shopping event (e.g., an operation of adding a commodity to be purchased to a shopping cart), and obtains an order Tip-1. The processing device obtains order Tip-1 and displays order Tip-1 on the screen of the processing device. Further, the processing device requests a payment platform to pay for the order, so as to deduct, from an account resource (e.g., an asset) of a second account ID-2 associated with the first account ID-1, an account resource to be deducted (e.g., a payment amount) indicated by order Tip-1. The foregoing is only an example. This is not limited in any way in this embodiment.

In the foregoing example, the first event result information displayed on the screen of the processing device may include at least one of the following: a user account name, an account resource to be deducted, and an event description, for example, an order account name, an order amount, and an order description. Optionally, this embodiment may not be limited to triggering to execute the second event when the account resource to be deducted is greater than or equal to a predetermined threshold.

It should be noted that, in this embodiment, a processing device obtains first event result information obtained by executing a first event by a first application client logged in on a mobile terminal by using a first account, where the first event result information indicates an account resource to be deducted; the first event result information is displayed on a user interface of the processing device; and further, the processing device requests to execute a second event used for deducting a certain amount of resource from a second account associated with the first account. That is, in this embodiment, the mobile terminal obtains and displays the first event result information that is obtained by executing the first event by the first application client logged in on the mobile terminal by using the first account and indicates the account resource to be deducted, so that the processing device requests to execute (e.g., execute the second event) deduction, from the account resource of the second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device. In addition, the first event result information is displayed at the processing device again, so that a user may confirm again the first event result information used for indicating the account resource to be deducted, thereby ensuring the security of account resources, and reducing a probability that an account resource is incorrectly deducted because of a mis-operation on the mobile terminal, so as to achieve an effect of improving the accuracy of event execution. Further, the processing device may further request in time, according to the displayed first event result information, to deduct, from the second account, the account resource to be deducted, thereby ensuring the execution efficiency of executing the second event by the processing device.

Optionally, in this embodiment, the first event result information may be directly buffered on the mobile terminal, or may be stored in a backend server, making it convenient for the processing device to obtain the first event result information and display the first event result information and convenient to execute the second event in time by using the processing device. Therefore, while the security of event result information is ensured, the objective of improving event execution efficiency can further be achieved.

Optionally, in this embodiment, the first application client logged in on the mobile terminal and an application logged in one the screen displayed by the processing device may be the same application or may be different applications. This is not limited in this embodiment.

For example, shopping payment is still used as an example, the first application client logged in on the mobile terminal may be a shopping application client, and an application logged in one the screen displayed by the processing device may be a third-party payment application client. That is, even if the first application client and the application logged in one the screen have different account systems, by means of the device provided in this embodiment, the first event result information in the first application client may be displayed on the screen of the processing device, so that the processing device is used in place of the mobile terminal to execute a shopping payment event that needs to be executed on the mobile terminal.

Optionally, in this embodiment, the obtaining first event result information obtained by executing a first event by a first application client logged in on a mobile terminal by using a first account may include at least one of the following steps:

1) Directly obtain a first URL matching the first event result information and returned by the mobile terminal, where the first URL at least includes a first event result identifier, so as to display the first event result information on the screen of the processing device by using the first event result identifier.

2) Display resource obtaining prompt information at the processing device, where the resource obtaining prompt information is used for indicating a resource obtaining identifier, and detect whether an account associated with the resource obtaining identifier exists, where the account is the first account of the first application client, to obtain at least one piece of event result information in the detected first account.

3) Detect, by using the processing device, whether the first event result information exists in the first account having an association relationship with a third account; and obtain the first event result information when it is detected that the first event result information exists, where the third account is used for logging in to the screen of the processing device, and the association relationship exists between the first account and the third account.

It should be noted that, in this embodiment, before the first event result information is obtained by using Manner 3), this embodiment may further include: establishing in advance an association relationship between the first account and the third account, that is, obtaining in advance the first account used for logging in to the first application client on the mobile terminal and the third account used for logging in on the corresponding page of the processing device, and establishing the association relationship between the first account and the third account, making it convenient for the processing device to detect, one the screen to which the third account is used for logging in, whether the first account having the association relationship with the third account exists. Therefore, the at least one piece of event result information in the first account is obtained when the first account is detected. The at least one piece of event result information includes the first event result information.

Optionally, in this embodiment, before the obtaining the first event result information, this embodiment may further include: logging in to the first application client on the mobile terminal by using the first account; and executing the first event on the first application client and obtaining the first event result information.

Details are described with reference to step S402 to step S410 in FIG. 4. For example, the processing device may be a PC 404. The first account (e.g., ID-1) may be used for logging in to the first application client (e.g., a shopping application client) on a mobile terminal 402. The PC 404 may execute the first event (e.g., placement of a purchase order) on the first application client (e.g., the shopping application client), and obtain the first event result information (e.g., an order Tip-1). After obtaining the first event result information from the mobile terminal 402, the PC 404 may display the first event result information on a user interface of the PC 404, making it convenient to confirm the first event result information again. Further, the PC 404 may request a server 406 (e.g., a payment platform server) to execute the second event, where the second event is used for deducting, from an account resource (e.g., an asset) of a second account (e.g., an ID-2) associated with the first account (e.g., ID-1), an account resource to be deducted (e.g., a payment amount).

In embodiments of the present disclosure, a mobile terminal obtains and displays first event result information that is obtained by executing a first event by a first application client logged in on the mobile terminal by using a first account and indicates an account resource to be deducted, so that a processing device requests to execute (e.g., execute a second event) deduction, from an account resource of a second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device.

In one embodiment, the display unit 1004 includes:
1) a first obtaining module, configured to obtain a first URL matching the first event result information, where the first URL at least includes a first event result identifier; and
2) a first display module, configured to display the first event result information on a user interface of the processing device according to the first event result identifier.

Optionally, in this embodiment, the first URL may not be limited to a URL that is obtained after the first application client on the mobile terminal executes the first event and matches the first event result information of the first event. For example, shopping payment is still used as an example, and the first event result identifier included in the first URL may not be limited to an order number. For example, the first URL may be as follows:

qian.tenpay.com?list=order number

Optionally, in this embodiment, the displaying the first event result information on the screen of the processing device according to the first event result identifier may include: inputting the first URL generated by the mobile terminal to the screen of the processing device, searching for the corresponding first event result information according to the first event result identifier in the first URL, and displaying the first event result information on the screen of the processing device.

In embodiments of the present disclosure, a first event result identifier used for identifying first event result information is built in a first URL, and the first URL is further input on a processing device. Therefore, a characteristic of a URL is used for displaying the first event result information in time on a user interface of the processing device, making it convenient to use the first event result information to rapidly execute a second event, thereby achieving an objective of improving event execution efficiency. In addition, a user may further confirm again the displayed first event result information indicating an account resource to be deducted, thereby ensuring the security of account resources.

In one embodiment, the obtaining unit 1002 includes:
1) a second display module, configured to display resource obtaining prompt information at the processing device, where the resource obtaining prompt information is used for indicating a resource obtaining identifier;
2) a first detection module, configured to detect, by using the processing device, whether an account associated with the resource obtaining identifier exists, where the account is the first account of the first application client; and
3) a second obtaining module, configured to obtain at least one piece of event result information in the first account by using the processing device when the first account associated with the resource obtaining identifier is detected, where the at least one piece of event result information includes the first event result information.

Optionally, in this embodiment, the resource obtaining prompt information may not be limited to a barcode. The barcode in this embodiment may include at least one of the following: a two-dimensional barcode and a linear barcode. Optionally, in this embodiment, the resource obtaining identifier may not be limited to a unique random number.

Optionally, in this embodiment, before the displaying the resource obtaining prompt information at the processing device, this embodiment may further include: displaying a page corresponding to a predetermined URL on the screen of the processing device. Further, the resource obtaining prompt information is displayed one the screen corresponding to the predetermined URL.

It should be noted that, in this embodiment, the predetermined URL may not be limited to including no first event result information, and therefore fewer characters are used compared with the first URL in the foregoing embodiments.

Optionally, in this embodiment, before the executing the second event, the method may include: selecting, from the at least one piece of event result information, the first event result information to be executed; or may include: selecting to execute all event result information. This is not limited in this embodiment.

In embodiments of the present disclosure, resource obtaining prompt information used for indicating a resource obtaining identifier is displayed on a processing device, and it is further detected by using the processing device whether an account associated with the resource obtaining identifier exists, where the account includes a first account, so that at least one piece of event result information in the first account is obtained when an account associated with the resource obtaining identifier is detected. Therefore, the resource obtaining prompt information is provided to detect whether an associated account exists, so as to obtain event result information in the detected account, making it convenient to execute a second event by using the obtained event result information.

In one embodiment, the second display module includes:
1) a generation submodule, configured to randomly generate the resource obtaining identifier at the processing device; and
2) an encoding submodule, configured to encode the resource obtaining identifier into a barcode, to obtain resource obtaining prompt information.

Optionally, in this embodiment, the resource obtaining identifier may not be limited to a randomly-generated unique random number. Further, the unique random number is encoded into a barcode, to obtain the resource obtaining prompt information used for being displayed at the processing device. That is, the resource obtaining prompt information (e.g., the barcode) displayed by the processing device is provided for a mobile terminal to perform scanning. After the mobile terminal detects the resource obtaining prompt information (e.g., the barcode) (e.g., the mobile terminal successfully obtains the resource obtaining prompt information through the scanning), an association relationship may be established between the first event result information on the mobile terminal and the resource obtaining identifier. In this way, the processing device may find the first event result information according to the resource obtaining identifier and display the first event result information.

In embodiments of the present disclosure, resource obtaining prompt information used for indicating a resource obtaining identifier is generated on a processing device, to enable a mobile terminal to rapidly provide first event result information to the processing device, thereby displaying the first event result information on a user interface of the processing device in time, making it convenient for the processing device to rapidly execute a second event, thereby achieving an objective of improving-event execution efficiency.

In one embodiment, a third account is used for logging in to the screen of the processing device, an association relationship exists between the first account and the third account, and the obtaining unit 1002 includes:
1) a second detection module, configured to detect, by using the processing device, whether the first event result information exists in the first account having the association relationship with the third account; and
2) a third obtaining module, configured to obtain the first event result information obtained by executing the first event by the first application client logged in on the mobile terminal by using the first account when it is detected that the first event result information exists.

Optionally, in this embodiment, before the detecting, by using the processing device, whether the first event result information exists in the first account having the association relationship with the third account, this embodiment may further include: obtaining in advance the first account used for logging in to the first application client on the mobile terminal and the third account used for logging in on the corresponding page of the processing device; and establishing the association relationship between the first account and the third account.

Optionally, in this embodiment, the detecting, by using the processing device, whether the first event result information exists in the first account having the association relationship with the third account may include: performing detection and scanning periodically to determine whether the first event result information exists in the first account having the association relationship with the third account.

In embodiments of the present disclosure, an association relationship between a first account used for logging in to a first application client on a mobile terminal and a third account used for logging in to a user interface of a processing device is established in advance, making it convenient for the processing device to detect and obtain in time event result information in the first account having the association relationship with the third account, so that the processing device may display the event result information one the screen in time, to enable the processing device to request in time, according to the displayed event result information, to execute a second event, thereby achieving an effect of improving the execution efficiency of executing the second event by the processing device.

In one embodiment, the execution unit 1006 includes:
1) a receiving module, configured to receive a trigger operation on a trigger button displayed on the screen of the processing device, where the trigger button is used for triggering execution of the second event.

Optionally, in this embodiment, the screen of the processing device further includes a trigger button used for triggering execution of the second event. It should be noted that, in this embodiment, the second account associated with the first account in the second event may include one or more accounts. For example, shopping payment is still used as an example, and a login account of a shopping application may not be limited to having an association relationship with one or more payment accounts.

In embodiments of the present disclosure, a trigger button is set on a user interface of a processing device, to enable the processing device to receive a trigger operation on the trigger button to trigger execution of a second event, so as to avoid a mis-operation on the second event, and further avoid a mis-operation on an account resource, thereby achieving an objective of ensuring the security of account resources.

Figure 11:
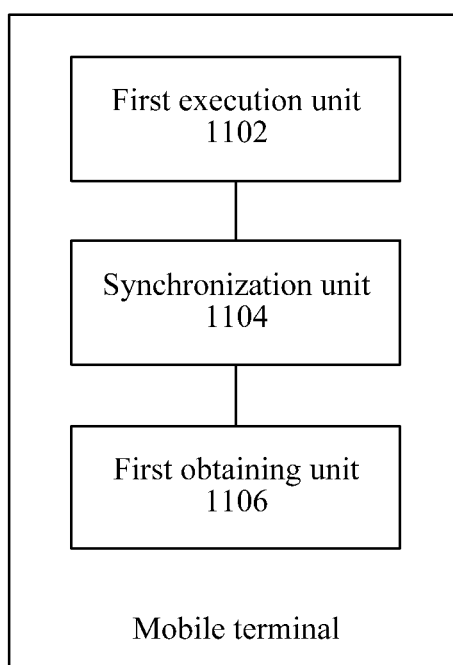
FIG. 11 is a schematic diagram of a mobile terminal in an optional event execution system according to an embodiment of the present disclosure.

According to this embodiment of the present disclosure, an event execution system configured to implement the foregoing event execution method is further provides. The foregoing system includes a mobile terminal. As shown in FIG. 11, the mobile terminal includes:
1) a first execution unit 1102, configured to execute a first event on a first application client logged in on the mobile terminal by using a first account;
2) a synchronization unit 1104, configured to synchronize first event result information obtained by executing the first event to a processing device, to enable the processing device to execute a second event, where the first event result information indicates an account resource to be deducted, and the second event is used for deducting a certain amount of resource from a second account associated with the first account; and
3) a first obtaining unit 1106, configured to obtain second event result information obtained by executing the second event.

Optionally, in this embodiment, the foregoing event execution system may not be limited to the application of a process of using the mobile terminal to execute an application event. For example, the first application client may be a shopping application client, the first event may be a shopping operation, the corresponding first event result information may be an order, and the second event may be a payment order.

For the foregoing system, the shopping application client on the mobile terminal may be used for executing a shopping event. Specifically, after a first account ID-1 is used for logging in to the shopping application client on the mobile terminal, and the shopping application client may execute the shopping event (e.g., an operation of adding goods to be purchased to a shopping cart), and obtain an order Tip-1. The processing device obtains order Tip-1 and displays order Tip-1 on the screen of the processing device. Further, the processing device requests a payment platform to pay for the order, so as to deduct, from a second account ID-2 associated with the first account ID-1, an account resource to be deducted (e.g., the payment amount) indicated by order Tip-1. The foregoing is only an example. This is not limited in any way in this embodiment.

In the foregoing example, the first event result information displayed on the screen of the processing device may include at least one of the following: a user account name, an account resource to be deducted, and an event description, for example, an order account name, an order amount, and an order description. Optionally, this embodiment may not be limited to triggering to execute the second event when the account resource to be deducted is greater than or equal to a predetermined threshold.

It should be noted that, in this embodiment, a first application client logged in on a mobile terminal by using a first account executes a first event; first event result information obtained by executing the first event is synchronized to a processing device, to enable the processing device to execute a second event, where the first event result information indicates an account resource to be deducted, and the second event is used for deducting a certain amount of resource from a second account associated with the first account; and second event result information obtained by executing the second event is obtained, so that the processing device requests to execute (e.g., execute the second event) deduction, from the account resource of the second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device. In addition, the first event result information is displayed at the processing device again, so that a user may confirm again the first event result information used for indicating the account resource to be deducted, thereby ensuring the security of account resources, and reducing a probability that an account resource is incorrectly deducted because of a mis-operation on the mobile terminal, so as to achieve an effect of improving the accuracy of event execution. Further, the processing device may further request in time, according to the displayed first event result information, to deduct, from the second account, the account resource to be deducted, thereby ensuring the execution efficiency of executing the second event by the processing device.

Optionally, in this embodiment, the first event result information may be directly buffered on the mobile terminal, or may be stored in a backend server, making it convenient for the processing device to obtain the first event result information and display the first event result information and convenient to execute the second event in time by using the processing device. Therefore, while the security of event result information is ensured, the objective of improving event execution efficiency can further be achieved.

Optionally, in this embodiment, the first application client logged in on the mobile terminal and an application logged in one the screen displayed by the processing device may be the same application or may be different applications. This is not limited in this embodiment.

Optionally, in this embodiment, the synchronizing first event result information obtained by executing the first event to a processing device includes one of the following steps:

1) Synchronize a first URL matching the first event result information from the first application client to the processing device, where the first URL at least includes a first event result identifier, and the first event result identifier is used for instructing the processing device to obtain the first event result information.

2) Scan a barcode displayed at the processing device by using the first application client, and synchronize association information to the processing device, to enable the processing device to obtain the first event result information of the first account according to the association information, where the association information is used for indicating that the first account is associated with a resource obtaining identifier represented by the barcode.

3) Synchronize, by using the first application client, the first event result information to the processing device on which a third account is used for logging in, where an association relationship exists between the first account and the third account.

Optionally, in this embodiment, the foregoing system further includes the processing device, and the processing device includes:

1) a second obtaining unit, configured to: after the first event result information is obtained, obtain the first event result information by using the processing device;

2) a display unit, configured to display the first event result information on the screen of the processing device; and 3) a second execution unit, configured to request, by using the processing device, to execute the second event.

In embodiments of the present disclosure, a first application client logged in on a mobile terminal by using a first account executes a first event; first event result information obtained by executing the first event is synchronized to a processing device, to enable the processing device to execute a second event, where the first event result information indicates an account resource to be deducted, and the second event is used for deducting a certain amount of resource from a second account associated with the first account; and second event result information obtained by executing the second event is obtained, so that the processing device requests to execute (e.g., execute the second event) deduction, from the account resource of the second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device.

In one embodiment, the synchronization unit 1104 includes a first synchronization module or a second synchronization module or a third synchronization module.

1) The first synchronization module is configured to synchronize a first URL matching the first event result information from the first application client to the processing device, where the first URL at least includes a first event result identifier, and the first event result identifier is used for instructing the processing device to obtain the first event result information.

Optionally, in this embodiment, the first URL may not be limited to a URL that is obtained after the first application client on the mobile terminal executes the first event and matches the first event result information of the first event. For example, shopping payment is still used as an example, and the first event result identifier included in the first URL may not be limited to an order number. For example, the first URL may be as follows:

qian.tenpay.com?list=order number

Optionally, in this embodiment, the displaying the first event result information on the screen of the processing device according to the first event result identifier may include: inputting the first URL obtained by the mobile terminal to the screen of the processing device, searching for the corresponding first event result information according to the first event result identifier in the first URL, and displaying the first event result information on the screen of the processing device.

2) The second synchronization module is configured to scan a barcode displayed at the processing device by using the first application client, and synchronize association information to the processing device, to enable the processing device to obtain the first event result information of the first account according to the association information, where the association information is used for indicating that the first account is associated with a resource obtaining identifier represented by the barcode.

Optionally, in this embodiment, the resource obtaining prompt information may not be limited to a barcode. The barcode in this embodiment may include at least one of the following: a two-dimensional barcode and a linear barcode. Optionally, in this embodiment, the resource obtaining identifier may not be limited to a unique random number.

Optionally, in this embodiment, before the displaying the resource obtaining prompt information at the processing device, this embodiment may further include: displaying a page corresponding to a predetermined URL on the screen of the processing device. Further, the resource obtaining prompt information is displayed one the screen corresponding to the predetermined URL.

3) The third synchronization module is configured to synchronize, by using the first application client, the first event result information to the processing device on which a third account is used for logging in, where an association relationship exists between the first account and the third account.

Optionally, in this embodiment, the detecting, by using the processing device, whether the first event result information exists in the first account having the association relationship with the third account may include: performing detection and scanning periodically to determine whether the first event result information exists in the first account having the association relationship with the third account.

In one embodiment, the foregoing system further includes the processing device, and the processing device includes:

1) a second obtaining unit, configured to: after the first event result information is obtained, obtain the first event result information by using the processing device;

2) a display unit, configured to display the first event result information on the screen of the processing device; and 3) a second execution unit, configured to request, by using the processing device, to execute the second event.

In embodiments of the present disclosure, after first event result information is obtained, a processing device obtains and displays, from a mobile terminal, the first event result information that is obtained by executing a first event by a first application client logged in on the mobile terminal by using a first account and indicates an account resource to be deducted, so that the processing device requests to execute (e.g., execute a second event) deduction, from an account resource of a second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device.

In one embodiment, the display unit includes:
1) a first obtaining module, configured to obtain a first URL matching the first event result information, where the first URL at least includes a first event result identifier; and
2) a first display module, configured to display the first event result information on the screen of the processing device according to the first event result identifier.

In embodiments of the present disclosure, a first event result identifier used for identifying first event result information is built in a first URL, and the first URL is further input on a processing device. Therefore, a characteristic of a URL is used for displaying the first event result information in time on a user interface of the processing device, making it convenient to use the first event result information to rapidly execute a second event, thereby achieving an objective of improving event execution efficiency. In addition, a user may further confirm again the displayed first event result information indicating an account resource to be deducted, thereby ensuring the security of account resources.

In one embodiment, the second obtaining unit includes:
1) a second display module, configured to display resource obtaining prompt information at the processing device, where the resource obtaining prompt information is used for indicating a resource obtaining identifier;
2) a first detection module, configured to detect, by using the processing device, whether an account associated with the resource obtaining identifier exists, where the account is the first account of the first application client; and
3) a second obtaining module, configured to obtain at least one piece of event result information in the first account by using the processing device when the first account associated with the resource obtaining identifier is detected, where the at least one piece of event result information includes the first event result information.

Optionally, in this embodiment, the resource obtaining prompt information may not be limited to a barcode. The barcode in this embodiment may include at least one of the following: a two-dimensional barcode and a linear barcode. Optionally, in this embodiment, the resource obtaining identifier may not be limited to a unique random number.

Optionally, in this embodiment, before the displaying resource obtaining prompt information at the processing device, this embodiment may further include: displaying a page corresponding to a predetermined URL on the screen of the processing device. Further, the resource obtaining prompt information is displayed one the screen corresponding to the predetermined URL.

Optionally, in this embodiment, before the executing the second event, the method may include: selecting, from the at least one piece of event result information, the first event result information to be executed; or may include: selecting to execute all event result information. This is not limited in this embodiment.

In embodiments of the present disclosure, resource obtaining prompt information used for indicating a resource obtaining identifier is displayed on a processing device, and it is further detected by using the processing device whether an account associated with the resource obtaining identifier exists, where the account includes a first account, so that at least one piece of event result information in the first account is obtained when an account associated with the resource obtaining identifier is detected. Therefore, the resource obtaining prompt information is provided to detect whether an associated account exists, so as to obtain event result information in the detected account, making it convenient to execute a second event by using the obtained event result information.

In one embodiment, the second display module includes:
1) a generation submodule, configured to randomly generate the resource obtaining identifier at the processing device; and
2) an encoding submodule, configured to encode the resource obtaining identifier into a barcode, to obtain the resource obtaining prompt information.

Optionally, in this embodiment, the resource obtaining identifier may not be limited to a randomly-generated unique random number. Further, the unique random number is encoded into a barcode, to obtain the resource obtaining prompt information used for being displayed at the processing device. That is, the resource obtaining prompt information (e.g., the barcode) displayed by the processing device is provided for a mobile terminal to perform scanning. After the mobile terminal detects the resource obtaining prompt information (e.g., the barcode) (e.g., the mobile terminal successfully obtains the resource obtaining prompt information through the scanning), an association relationship may be established between the first event result information on the mobile terminal and the resource obtaining identifier. In this way, the processing device may find the first event result information according to the resource obtaining identifier and display the first event result information.

In embodiments of the present disclosure, resource obtaining prompt information used for indicating a resource obtaining identifier is generated on a processing device, to enable a mobile terminal to rapidly provide first event result information to the processing device, thereby displaying the first event result information on a user interface of the processing device in time, making it convenient for the processing device to rapidly execute a second event, thereby achieving an objective of improving-event execution efficiency.

In one embodiment, a third account is used for logging in to the screen of the processing device, an association relationship exists between the first account and the third account, and the first obtaining unit includes:
1) a second detection module, configured to detect, by using the processing device, whether the first event result information exists in the first account having the association relationship with the third account; and
2) a third obtaining module, configured to obtain the first event result information obtained by executing the first event by the first application client logged in on the mobile terminal by using the first account when it is detected that the first event result information exists.

Optionally, in this embodiment, before the detecting, by using the processing device, whether the first event result information exists in the first account having the association relationship with the third account, this embodiment may further include: obtaining in advance the first account used for logging in to the first application client on the mobile terminal and the third account used for logging in on the corresponding page of the processing device; and establishing the association relationship between the first account and the third account.

In embodiments of the present disclosure, an association relationship between a first account used for logging in to a first application client on a mobile terminal and a third account used for logging in to a user interface of a processing device is established in advance, making it convenient for the processing device to detect and obtain in time event result information in the first account having the association relationship with the third account, so that the processing device may display the event result information one the screen in time, to enable the processing device to request in time, according to the displayed event result information, to execute a second event, thereby achieving an effect of improving the execution efficiency of executing the second event by the processing device.

In one embodiment, the second execution unit includes:
1) a receiving module, configured to receive a trigger operation on a trigger button displayed on the screen of the processing device, where the trigger button is used for triggering execution of the second event.

Optionally, in this embodiment, the screen of the processing device further includes a trigger button used for triggering execution of the second event. It should be noted that, in this embodiment, the second account associated with the first account in the second event may include one or more accounts. For example, shopping payment is still used as an example, and a login account of a shopping application may not be limited to having an association relationship with one or more payment accounts.

In embodiments of the present disclosure, a trigger button is set on a user interface of a processing device, to enable the processing device to receive a trigger operation on the trigger button to trigger execution of a second event, so as to avoid a mis-operation on the second event, and further avoid a mis-operation on an account resource, thereby achieving an objective of ensuring the security of account resources.

Embodiment 5

This embodiment of the present disclosure provides an application scenario used for implementing the foregoing event execution method. An application environment in this embodiment is the same as that described above. This is not repeated here in this embodiment.

Figure 14:
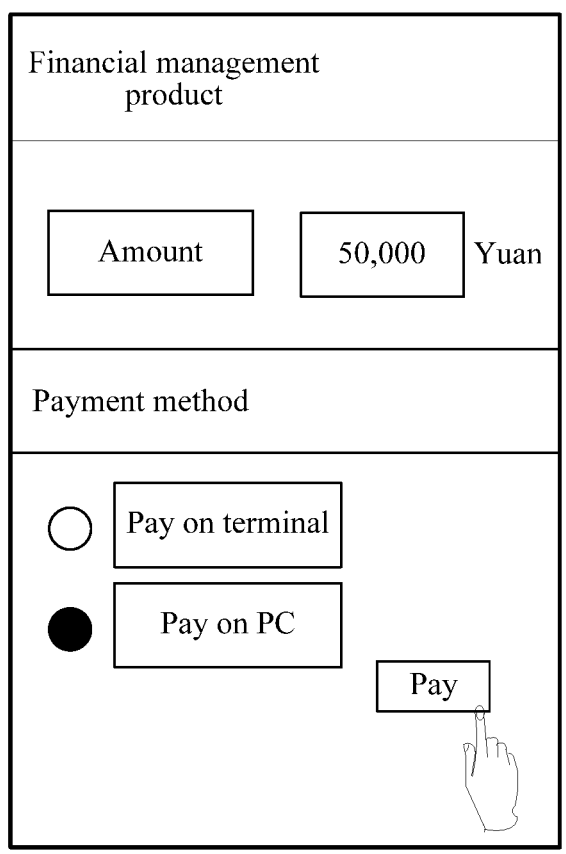
FIG. 14 is a schematic diagram of another optional event execution method according to an embodiment of the present disclosure.

In an optional embodiment, purchase of a financial management product on a financial management platform is used as an example. For example, a processing device is a PC. Details are described with reference to an example shown in FIG. 14:

After a mobile terminal uses a first account ID-1 to log in to an application client of the financial management platform, the application client of the financial management platform is used for executing purchase of a financial management product ID-1, and obtaining an interface shown in FIG. 14. An event of the purchase indicates an account resource to be deducted (e.g., a payment amount). For example, the account resource to be deducted is 50,000 yuan that is greater than a predetermined amount (e.g., the predetermined amount is 20,000 yuan). The mobile terminal synchronizes information displayed on the interface to the PC, and displays the information on a user interface of the PC. Further, the PC requests a payment platform to pay the amount required for the financial management product, so as to deduct, from an account resource (e.g., an asset) of a second account ID-2 associated with the first account ID-1 on the payment platform, the account resource to be deducted (e.g., 50,000 yuan). As shown in FIG. 14, by selecting "Pay on PC", an online bank on the PC is used for deducting 50,000 yuan required to purchase the financial management product ID-1.

Figure 12:
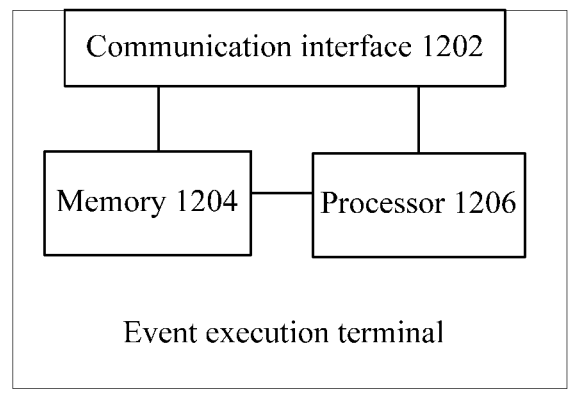
FIG. 12 is a schematic diagram of an optional event execution terminal according to an embodiment of the present disclosure.

According to this embodiment of the present disclosure, an event execution terminal configured to implement the foregoing event execution method is further provided. As shown in FIG. 12, the terminal includes:
1) a communication interface 1202, configured to obtain result information obtained by executing a first event by a first application client logged in on a mobile terminal by using a first account first event, where the first event result information indicates an account resource to be deducted;
2) a memory 1204, connected to the communication interface 1202, and configured to store the first event result information; and
3) a processor 1206, connected to the communication interface 1202 and the memory 1204, and configured to display the first event result information on a user interface of a processing device; and further configured to request to execute a second event by using the processing device, where the second event is used for deducting a certain amount of resource from a second account associated with the first account.

Figure 13:
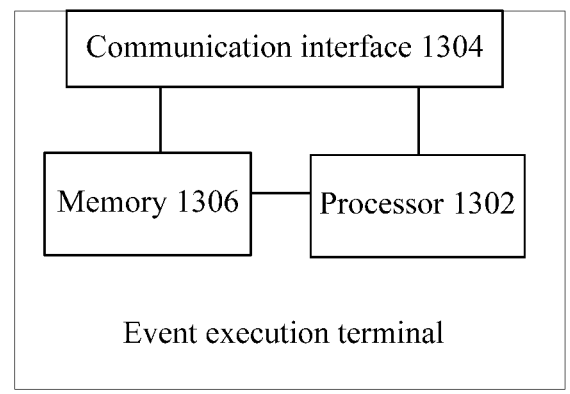
FIG. 13 is a schematic diagram of another optional event execution terminal according to an embodiment of the present disclosure.

In this embodiment, an event execution terminal configured to implement the foregoing event execution method is further provided. As shown in FIG. 13, the terminal includes:
1) a processor 1302, configured to execute a first event on a first application client logged in on a mobile terminal by using a first account;
2) a communication interface 1304, connected to the processor 1302, and configured to synchronize first event result information obtained by executing the first event to a processing device, to enable the processing device to execute a second event, where the first event result information indicates an account resource to be deducted; and further configured to obtain second event result information obtained by executing the second event, where the second event is used for deducting a certain amount of resource from a second account associated with the first account; and
3) a memory 1306, connected to the processor 1302 and the communication interface 1304, and configured to store the first event result information and the second event result information.

Optionally, for the specific example in this embodiment, reference may be made to the examples described in the foregoing Embodiment 1 and Embodiment 2. This is not repeated here in this embodiment.

This embodiment of the present disclosure further provides a storage medium. Optionally, in this embodiment, the storage medium is configured to store program code used for performing the following steps:

S1: Obtain result information obtained by executing a first event by a first application client logged in on a mobile terminal by using a first account first event, where the first event result information indicates an account resource to be deducted.

S2: Display the first event result information on a user interface of a processing device.

S3: Request to execute a second event by using the processing device, where the second event is used for deducting a certain amount of resource from a second account associated with the first account.

Optionally, in this embodiment, the storage medium is further configured to store program code used for performing the following steps: obtaining a first URL matching the first event result information, where the first URL at least includes a first event result identifier; and displaying the first event result information on the screen of the processing device according to the first event result identifier.

Optionally, in this embodiment, the storage medium is further configured to store program code used for performing the following steps: displaying resource obtaining prompt information at the processing device, where the resource obtaining prompt information is used for indicating a resource obtaining identifier; detecting, by using the processing device, whether an account associated with the resource obtaining identifier exists, where the account is the first account of the first application client; and obtain at least one piece of event result information in the first account by using the processing device if the first account associated with the resource obtaining identifier is detected, where the at least one piece of event result information includes the first event result information.

Optionally, in this embodiment, the storage medium is further configured to store program code used for performing the following steps: randomly generating the resource obtaining identifier at the processing device; and encoding the resource obtaining identifier into a barcode, to obtain the resource obtaining prompt information.

Optionally, in this embodiment, a third account is used for logging in to the screen of the processing device, an association relationship exists between the first account and the third account, and the storage medium is further configured to store program code used for performing the following steps: detecting, by using the processing device, whether the first event result information exists in the first account having the association relationship with the third account; and obtaining the first event result information obtained by executing the first event by the first application client logged in on the mobile terminal by using the first account if it is detected that the first event result information exists.

Optionally, in this embodiment, the storage medium is further configured to store program code used for performing the following step: receiving a trigger operation on a trigger button displayed on the screen of the processing device, where the trigger button is used for triggering execution of the second event.

Optionally, in this embodiment, the foregoing storage medium may include: a USB flash drive, a ROM, a RAM, a removable hard disk, a magnetic disk, an optical disc, or various other media that can store program code.

Optionally, for the specific example in this embodiment, reference may be made to the examples described in the foregoing embodiments. This is not repeated here in this embodiment.

The sequence numbers of the foregoing embodiments of the present disclosure are merely for the convenience of description, and do not imply the preference among the embodiments.

If implemented in the form of software functional units and sold or used as an independent product, the integrated units in the foregoing embodiments may be stored in the foregoing computer readable storage medium. Based on this, the technical solution of the present disclosure or the part that makes contributions to the related technology or the entire technical solution or a part of the technical solution may be substantially embodied in the form of a software product. The computer software product may be stored in a storage medium and contain several instructions to instruct one or more pieces of computer equipment (e.g., a PC, a server, or network equipment) to perform all or a part of the steps of the method described in the embodiments of the present disclosure.

In the foregoing embodiments of the present disclosure, the descriptions of the embodiments place different emphasis on different content, and for a part that is not detailed in an embodiment, reference can be made to the relevant descriptions of other embodiments.

In the embodiments provided by the present application, it should be understood that the clients disclosed may be implemented in other forms. For example, the device embodiments described above are merely exemplary. The division of units is merely logical functional division, and there are other division forms in real application. For example, multiple units or components may be combined or be integrated to another system, or some features may be ignored or not be executed. In another aspect, the coupling, direct coupling, or communication connection there between which is displayed or discussed may be indirect coupling or communication connection of interfaces, units or modules, and may be electrical or in other forms.

Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands.

In addition, the functional units in the embodiments of the present disclosure may either be integrated in a processing unit, or each unit may be a separate physical unit. In some embodiments, a functional unit may include one or more computer readable instructions stored in a computer readable medium. When executed by one or more processors, the computer readable instructions implement the functions of the corresponding functional unit. Alternatively, two or more of the units are integrated in one unit. The integrated unit may be implemented in the form of hardware, a combination of software and hardware, or may be implemented in the form of a software functional unit.

Only preferred embodiments of the present disclosure are described. It should be noted by persons of ordinary skill in the art that modifications and variations may be made without departing from the principle of the present disclosure, which should be construed as falling within the protection scope of the present disclosure.

INDUSTRIAL APPLICABILITY

In the embodiments of the present disclosure, a mobile terminal obtains and displays first event result information that is obtained by executing a first event by a first application client logged in on the mobile terminal by using a first account and indicates an account resource to be deducted, so that a processing device requests to execute (e.g., execute a second event) deduction, from an account resource of a second account, the account resource to be deducted indicated by the first event result information obtained by the mobile terminal, so as to use the processing device in place of the mobile terminal to complete an event to be executed by the mobile terminal, thereby overcoming a problem in the related technology that an event on the mobile terminal cannot be executed on the processing device.

What is claimed is:

1. An event execution method, comprising:
obtaining first event result information obtained by executing a first event by a shopping application client logged in on a mobile terminal of a user by using a first account of the user, the first event result information indicating an account resource to be deducted, wherein obtaining the first event result information includes:
obtaining, by the processing device, a first uniform resource locator (URL) matching the first event result information from the shopping application client; and
obtaining, by the processing device, the first event result information from the server via a first event result identifier included in the first URL;
determining by the processing device of the user that the first account is associated with a third account of the user;
displaying the first event result information on a screen of the processing device;
requesting to execute a second event on a corresponding page of a third-party payment application client of the processing device logged in by using the third account of the user, the second event being used for deducting an amount of resource from a second account associated with the first account, wherein the third-party payment application client is different than the shopping application client; and
requesting by the processing device to execute the second event after determining by the processing device that the first account is associated with the third account.

2. The method according to claim 1, further comprising:
displaying the first event result information on the screen of the processing device according to the first event result identifier.

3. The method according to claim 1, further comprising:
displaying resource obtaining prompt information on the processing device, wherein the resource obtaining prompt information is used for indicating a resource obtaining identifier;
detecting, by using the processing device, whether an account associated with the resource obtaining identifier exists, wherein the account is the first account of the shopping application client; and
obtaining at least one piece of event result information in the first account by using the processing device if the first account associated with the resource obtaining identifier is detected, wherein the at least one piece of event result information comprises the first event result information.

4. The method according to claim 3, further comprising:
generating the resource obtaining identifier at the processing device; and
encoding the resource obtaining identifier into a barcode, to obtain the resource obtaining prompt information.

5. The method according to claim 1, further comprising:
receiving a trigger operation on a trigger button displayed on the screen of the processing device, wherein the trigger button is used for triggering execution of the second event.

6. An event execution method, comprising:
executing a first event on a shopping application client logged in on a mobile terminal of a user by using a first account of the user to obtain first event result information;
sending the first event result information to a server to facilitate recording and storing by the server the first event result information;
synchronizing the first event result information to a processing device of the user, to enable the processing device to execute a second event on a corresponding page of a third-party payment application client logged in by using a third account of the user, the first event result information indicating an account resource to be deducted, and the second event being used for deducting an amount of resource from a second account associated with the first account, wherein the third-party payment application client is different than the shopping application client, and wherein synchronizing the first event result information includes:
synchronizing a first uniform resource location (URL) matching the first event result information from the shopping application client to the processing device; and
instructing the processing device to obtain the first event result information from the server via a first result identifier included in the first URL; and
obtaining second event result information from the processing device by executing the second event after determination by the processing device of the user that the first account is associated with the third account.

7. The method according to claim 6, further comprising:
displaying the first event result information on a user interface of a screen of the processing device.

8. The method according to claim 7, further comprising:
displaying the first event result information on the screen of the processing device according to the first event result identifier.

9. The method according to claim 7, further comprising:
displaying resource obtaining prompt information at the processing device, wherein the resource obtaining prompt information is used for indicating a resource obtaining identifier;
detecting, by using the processing device, whether an account associated with the resource obtaining identifier exists, wherein the account is the first account of the shopping application client; and
obtaining at least one piece of event result information in the first account by using the processing device if the first account associated with the resource obtaining identifier is detected, wherein the at least one piece of event result information comprises the first event result information.

10. The method according to claim 9, further comprising:
randomly generating the resource obtaining identifier at the processing device; and
encoding the resource obtaining identifier into a barcode, to obtain the resource obtaining prompt information.

11. The method according to claim 7, further comprising:
receiving a trigger operation on a trigger button displayed on the screen of the processing device, wherein the trigger button is used for triggering execution of the second event.

12. The method according to claim 6, further comprising:
displaying the first event result information or a user interface of the mobile terminal of the user; and
facilitating a display of the first event result information on a user interface of the processing device of the user.

13. An event execution apparatus, the apparatus being located in a processing device of a user, and the apparatus comprising a memory and a processor coupled to the memory, the processor being configured to:

obtain first event result information obtained by executing a first event by a shopping application client logged in on a mobile terminal of the user by using a first account of the user, the first event result information indicating an account resource to be deducted wherein obtaining the first event result information includes:
    obtaining a first uniform resource locator (URL) matching the first event result information from the shopping application client; and
    obtaining the first event result information from the server via a first event result identifier included in the first URL;
determine the first account is associated with a third account of the user;
display the first event result information on a user interface of the processing device; and
request to execute a second event on a corresponding page of a third-party payment application client of the processing device logged in by using the third account of the user, the second event being used for deducting an amount of resource from a second account associated with the first account, wherein the third-party payment application client is different than the shopping application client; and
request to execute the second event after determining that the first account is associated with the third account.

14. The apparatus according to claim 13, wherein the processor is further configured to:
display the first event result information on the display of the processing device according to the first event result identifier.

15. The apparatus according to claim 13, wherein the processor is further configured to:
display resource obtaining prompt information at the processing device, wherein the resource obtaining prompt information is used for indicating a resource obtaining identifier;
detect, by using the processing device, whether an account associated with the resource obtaining identifier exists, wherein the account is the first account of the shopping application client; and
obtain at least one piece of event result information in the first account by using the processing device when the first account associated with the resource obtaining identifier is detected, wherein the at least one piece of event result information comprises the first event result information.

16. The apparatus according to claim 15, wherein the processor is further configured to:
randomly generate the resource obtaining identifier at the processing device; and
encode the resource obtaining identifier into a barcode, to obtain the resource obtaining prompt information.

17. The apparatus according to claim 13, wherein the processor is further configured to: receive a trigger operation on a trigger button displayed on the display of the processing device, wherein the trigger button is used for triggering execution of the second event.

18. An event execution system, the system comprising a mobile terminal of a user, and the mobile terminal comprising a memory and processor, the processor being configured to:
execute a first event on a shopping application client logged in on the mobile terminal by using a first account of the user to obtain first event result information;
send the first event result information to a server to facilitate recording and storing by the server the first event result information;
synchronize the first event result information to a processing device of the user, to enable the processing device to execute a second event on a corresponding page of a third-party payment application logged in by using a third account of the user, wherein the first event result information indicates an account resource to be deducted, and the second event is used for deducting an amount of resource from a second account associated with the first account, wherein the third-party payment application client is different than the shopping application client, and wherein synchronize the first event result information includes:
    synchronize a first uniform resource location (URL) matching the first event result information from the shopping application client to the processing device; and
    instruct the processing device to obtain the first event result information from the server via a first result identifier included in the first URL; and
obtain second event result information from the processing device by executing the second event after determination by the processing device of the user that the first account is associated with the third account.

19. The system according to claim 18, wherein the system further comprises the processing device, and the processing device comprises a second memory and a second processor coupled to the second memory, the second processor being configured to:
after the first event result information is obtained, obtain the first event result information by using the processing device;
display the first event result information on a display of the processing device; and
request, by using the processing device, to execute the second event.

20. The system according to claim 19, wherein the second processor is further configured to:
obtain the first URL matching the first event result information, wherein the first URL at least comprises the first event result identifier; and
display the first event result information on the display of the processing device according to the first event result identifier.

21. The system according to claim 19, wherein the second processor is further configured to:
display resource obtaining prompt information at the processing device, wherein the resource obtaining prompt information is used for indicating a resource obtaining identifier;
detect, by using the processing device, whether an account associated with the resource obtaining identifier exists, wherein the account is the first account of the shopping application client; and
obtain at least one piece of event result information in the first account by using the processing device when the first account associated with the resource obtaining identifier is detected, wherein the at least one piece of event result information comprises the first event result information.

22. The system according to claim 21, wherein the second processor is further configured to:
randomly generate the resource obtaining identifier at the processing device; and encode the resource obtaining identifier into a barcode, to obtain the resource obtaining prompt information.

23. The system according to claim 19, wherein the second processor is further configured to: receive a trigger operation on a trigger button displayed on the display of the processing device, wherein the trigger button is used for triggering execution of the second event.

\* \* \* \* \*